US012590565B1

(12) United States Patent
Echemendia et al.

(10) Patent No.: US 12,590,565 B1
(45) Date of Patent: Mar. 31, 2026

(54) MODULAR WIND TURBINE BLADE DESIGNS

(71) Applicants: Abel Echemendia, Hypoluxo, FL (US); Abel J. Echemendia, Jr., Hypoluxo, FL (US); Daniel S. Echemendia, Hypoluxo, FL (US)

(72) Inventors: Abel Echemendia, Hypoluxo, FL (US); Abel J. Echemendia, Jr., Hypoluxo, FL (US); Daniel S. Echemendia, Hypoluxo, FL (US)

( * ) Notice: Subject to any disclaimer, the term of this patent is extended or adjusted under 35 U.S.C. 154(b) by 0 days.

(21) Appl. No.: 19/005,035

(22) Filed: Dec. 30, 2024

Related U.S. Application Data

(63) Continuation-in-part of application No. 18/641,509, filed on Apr. 22, 2024, now Pat. No. 12,313,033.

(51) Int. Cl.
   F03D 1/06 (2006.01)
   F03D 9/16 (2016.01)
(52) U.S. Cl.
   CPC ............. F03D 1/0677 (2023.08); F03D 9/16 (2016.05); *F05B 2240/302* (2013.01)
(58) Field of Classification Search
   CPC ......... F03D 1/0675; F03D 1/0677; F03D 9/16
   See application file for complete search history.

(56) References Cited

U.S. PATENT DOCUMENTS

| | | | |
|---|---|---|---|
| 7,632,070 B2 * | 12/2009 | Dawson ................ | F03D 7/0236 |
| | | | 415/4.1 |
| 11,454,216 B2 * | 9/2022 | Mishra ..................... | F03D 9/12 |
| 2012/0107116 A1 * | 5/2012 | Obrecht .................. | F03D 13/25 |
| | | | 416/1 |

FOREIGN PATENT DOCUMENTS

| | | | | | |
|---|---|---|---|---|---|
| CN | 117905631 A | * | 4/2024 | .......... | F03D 7/0296 |
| KR | 101368799 B1 | * | 3/2014 | .......... | F03D 7/0296 |

* cited by examiner

*Primary Examiner* — Justin D Seabe
(74) *Attorney, Agent, or Firm* — Donald J. Ersler

(57) ABSTRACT

Modular wind turbine blade designs include a plurality of modular sections that are attached to each other on site. Each section preferably includes a cross member and a plurality of lengthwise members. A plurality of fasteners are used to secure a cross member between end flanges of first and second sets of lengthwise members. The plurality of lengthwise members and cross members are covered with an outer skin. A weight system is preferably retained in an inner perimeter of a plurality of first lengthwise members. The weight system preferably includes a lengthwise frame, a rail structure, a sliding weight and at least one weight motor. A plurality of fins may be attached to a bottom surface of a modular blade assembly. A fin actuation mechanism may be used to move the position of a plurality of fins relative to a bottom surface of the modular blade assembly.

10 Claims, 31 Drawing Sheets

96

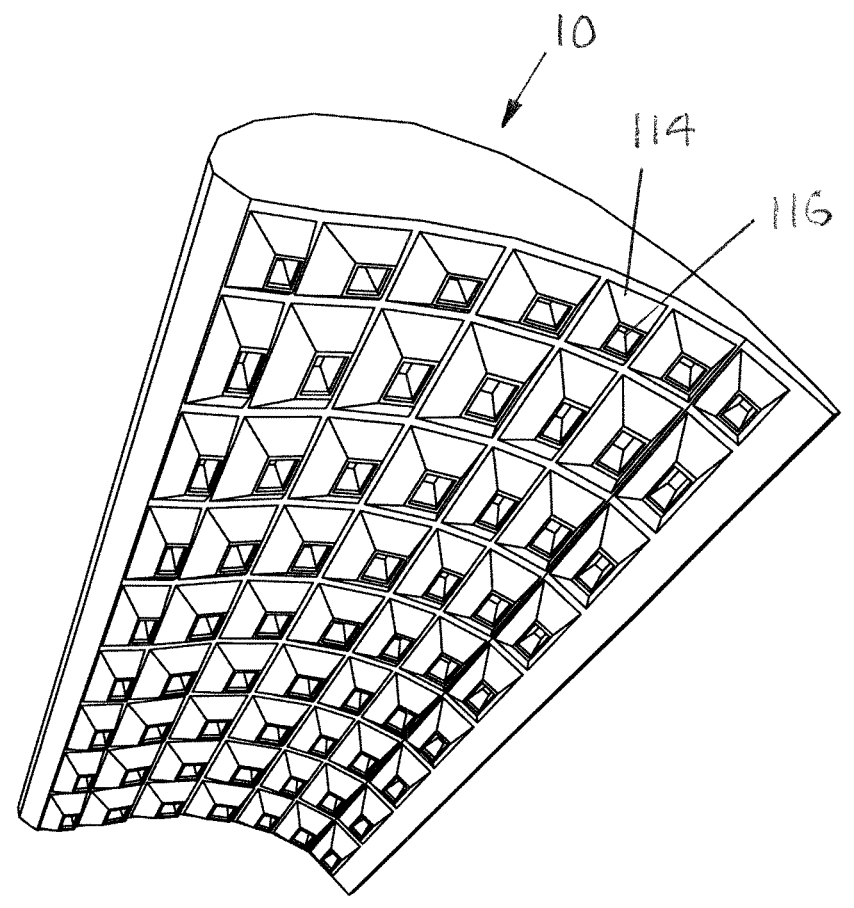
FIG, 24d

MODULAR WIND TURBINE BLADE DESIGNS

This is a continuation-in-part patent application which takes priority from patent application Ser. No. 18/641,509, filed on Apr. 22, 2024, which is thereby incorporated by reference in its entirety.

BACKGROUND OF THE INVENTION

1. Field of the Invention

The present invention relates generally to wind power generation and more specifically to modular wind turbine blade designs, which include blade designs that have improved effectiveness and efficiency relative to the prior art blade designs.

2. Discussion of the Prior Art

Modern wind turbine blades are constructed of composite materials and because of the limitations of these materials are built in one piece. As wind turbines and their blades continue to grow in size, this means that manufacturers are required to transport blades with lengths in excess of 100 meters, which greatly limits their usability to areas that can be accessed by extremely costly and specialized machinery. The turbine blade designs disclosed in this application are based on building wind turbine blades that are completely modular with pieces typically no bigger than a standard shipping container, which can be easily transported easily by land, rail, sea or even air and assembled on site.

The blade designs disclosed in this application will be fabricated using metal or metal alloys, but may also be constructed with composites or a combination of metals and composites. The blade components can be constructed with recycled materials and can also be recycled at the end of its lifecycle. Another important benefit when compared to one piece composite blades is the ability for the modular blades to be easily be repaired. It may be less expensive to repair a blade, instead of replacing the entire blade, when damaged. Repairing the blade could mean that the wind turbine stays in service for a much longer time.

The next technology advancement to wind turbine blades is the addition of a system that can incorporate the principle of centrifugal forces to increase the speed and torque of wind turbine blades to produce more power. The proposed design will have a frame inside of the blade that allows at least one weight to be extended or retracted by electricity, hydraulics, pneumatics, gravitational forces or any combination. The frame will run from the main shaft to the tip of the blade or any length within the blade as needed.

When the wind turbine is not spinning, the weight will be retracted as close to the main shaft in order to minimize the potential impact it would have on the wind turbine beginning to spin and to allow for the weight system to be serviced. As the blades begin to spin fast enough, the weight in the blade will begin to extend the entire length of the frame towards the tip. The extended weight will result in the spinning blades having a flywheel effect.

Another embodiment of this system would have multiple smaller weights that could be extended or retracted individually in order to have greater control on the centrifugal force applied to the wind turbine. By having weight added to the end of the blade it will greatly increase the speed and torque applied to the main shaft and therefore increase the total power created by the generator. If the wind speed slows down or is in excess of the operating wind speed, the weight or weights can be retracted towards the main shaft.

Wind turbine blades are designed to capture the force of the wind to spin a shaft that is connected to a generator that in turn produces power as the shaft rotates. Current wind turbine blades are designed to be cost effective while also being optimized to spin the shaft as fast as possible, within a defined wind speed range, so that the blades reach a minimum required speed for the generator to produce power. Along with rotational speed, the amount of power a wind turbine will generate is also determined by the amount of torque generated by the blades which is based on the amount of lift they produce.

The last proposed concept is to increase the amount of lift and torque produced by the blades by altering the bottom of the blades in a variety of ways that increase the amount of surface area while simultaneously not disturbing the airflow passing above the blade. By increasing the surface area on the bottom of the blade it is proposed that the blade will be able to harness more of the wind passing over the blade to increase lift and in turn increase the speed and torque produced by the blades. The two options to increase surface area on the bottom of the blade are to incorporate a textured surface and/or to mount a fin or plurality of fins. Both of these methods can be used for new wind turbine blades or when retrofitting existing blades.

The textured surface will vary in graduating levels of effect based on what the design calls for, but will range from a rough surface akin to sandpaper all the way to a molded pattern with a change of depth of up to a few inches. These textured surfaces can be applied to the wind turbine blades in any number of ways including spraying them on, using adhesives or even imprinting or molding them into the metal or composite materials used for the exterior surface of the blade itself.

Similar to how wind turbine blades are shaped to produce lift from the wind, the addition of at least one fin to the bottom of the blade. The at least one fin will increase the amount of surface area able to make use of the wind to produce more lift. Depending on the design, the blade may have at least one fin installed in varying positions or have fins of varying sizes. Additionally, the at least one fin can be designed to be static; have the ability to be tilted at different angles; to fold flat along the blade; and/or to be retracted into the blade or extended out at different lengths depending on the wind speed. These different functions can also be accomplished through the use of electricity, hydraulics or pneumatics. For installation in areas with temperatures below freezing the blades can incorporate a recirculating heating system that runs along the blade to prevent the components from freezing.

Accordingly, there is a clearly felt need in the art for modular wind turbine blade designs, which include blade designs that have improved effectiveness and efficiency relative to the prior art blade designs.

SUMMARY OF THE INVENTION

The present invention provides modular wind turbine blade designs, which include blade designs that have improved effectiveness and efficiency. A wind turbine rotating tower preferably includes an adaptive nacelle, a stationary base, a rotating tower, a plurality of motor systems and a blade assembly. The rotating tower preferably includes a symmetrical biconvex shape. Each blade assembly includes a plurality of modular blade assemblies and a blade hub. The plurality of modular blade assemblies extend from the blade hub. Each modular blade assembly includes a plurality of modular sections that are preferably attached to each other on site. Each modular blade assembly preferably includes a plurality of sections. Each modular section preferably includes a cross member and a plurality of lengthwise members. A plurality of fasteners are used to secure the cross member between opposing end flanges of a first set of lengthwise members and end flanges of a second set of lengthwise members. The plurality of modular sections are covered with an outer skin.

A weight system is preferably retained in an inner perimeter of the plurality of first lengthwise members. The weight system preferably includes a lengthwise frame, a rail structure, a sliding weight and at least one weight motor. An outer perimeter of the lengthwise frame is sized to be retained inside the plurality of first length members. The rail structure is retained in the lengthwise frame. The sliding weight is slidably retained by the rail structure. One end of a cable is attached to the sliding weight and other end of the cable is attached to a pulley, which is retained on an output shaft of the at least one weight motor. The at least one weight motor is rotated to change a position of the sliding weight relative to blade hub. The at least one weight motor may be driven by electricity, hydraulics or pneumatics.

A plurality of fins may be attached to a bottom surface of the modular blade assembly. The plurality of fins may have the same size or have different sizes. A fin actuation mechanism may be used to change a position of a plurality of fins relative to a bottom surface of the modular blade assembly. A plurality of sub fans may be attached to each fin. A sub fin actuation mechanism may be used to change a position of the plurality of sub fins relative to the fin. A plurality of "T" projections, or convex projections may be formed on a bottom of each modular blade assembly to maximize the use of available wind speed. The size of modified bottom surface may range from sandpaper to a molded pattern up to a few inches in height. The bottom surface of the modular blade assembly may be modified by forming a plurality of trapezoidal cavities therein; forming a plurality of trapezoidal projections thereupon; forming a plurality of trapezoidal projections, each with a trapezoidal cavity or forming a plurality of circular cavities therein.

Accordingly, it is an object of the present invention to provide modular wind turbine blade designs, which include blade designs that have improved effectiveness and efficiency relative to the prior art blade designs.

These and additional objects, advantages, features and benefits of the present invention will become apparent from the following specification.

5

Figure 20:
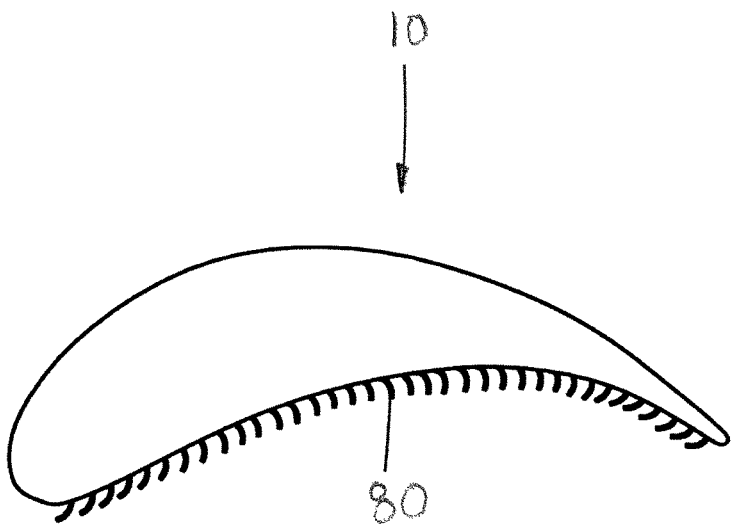

FIG. 20 is an end view of a modular blade assembly with a plurality of fins attached to a bottom surface thereof with different angular orientations in accordance with the present invention.

Figures 21A, 21B:
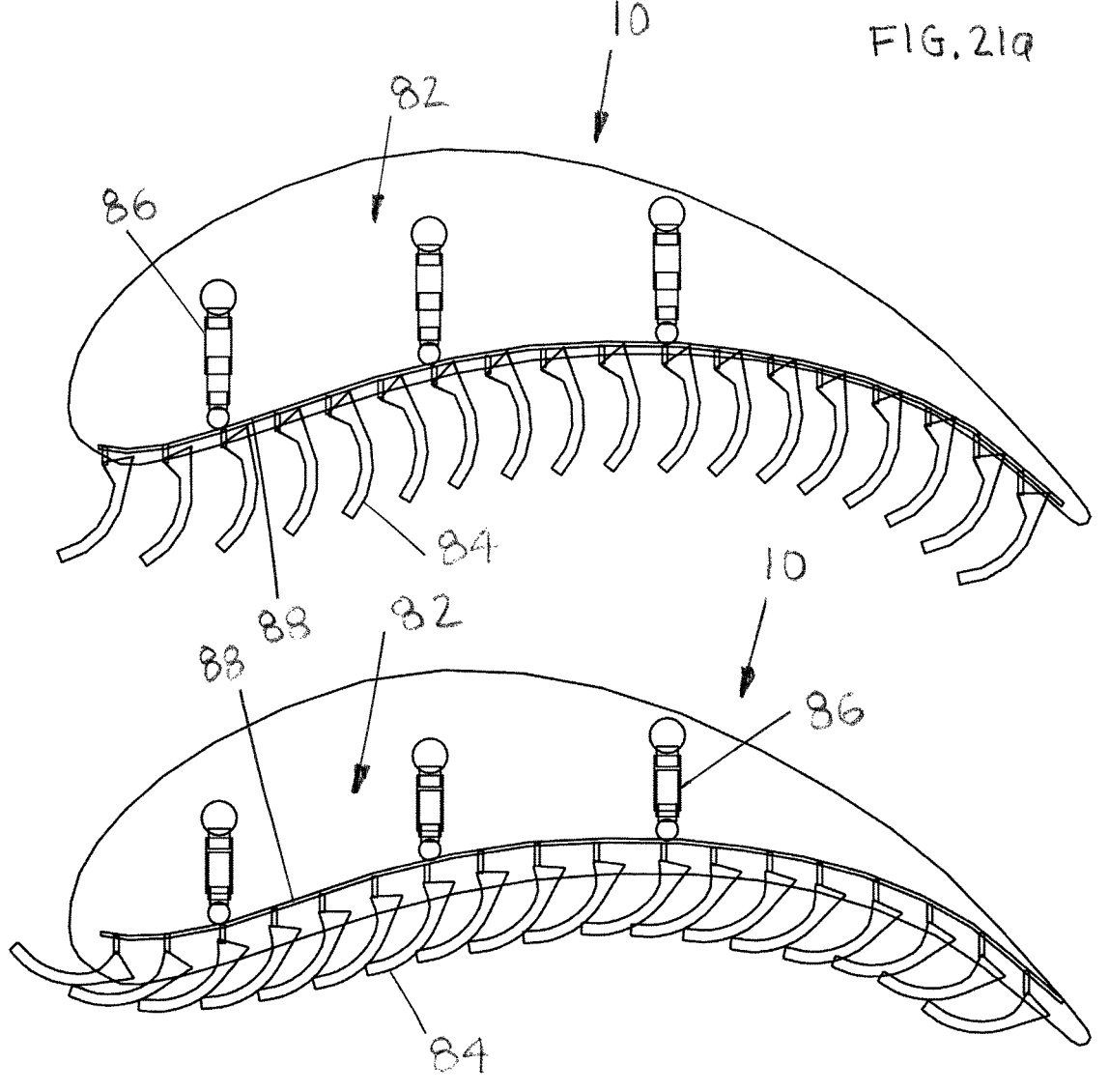

FIG. 21*a* is an end view of a modular blade assembly with a mechanism for changing a position of a plurality of fins relative to a bottom surface of the modular blade assembly in accordance with the present invention.

FIG. 21*b* is an end view of a modular blade assembly with a fin mechanism for changing a position of a plurality of fins relative to a bottom surface of the modular blade assembly, after actuating the fin mechanism in accordance with the present invention.

Figures 22A, 22B, 22C:
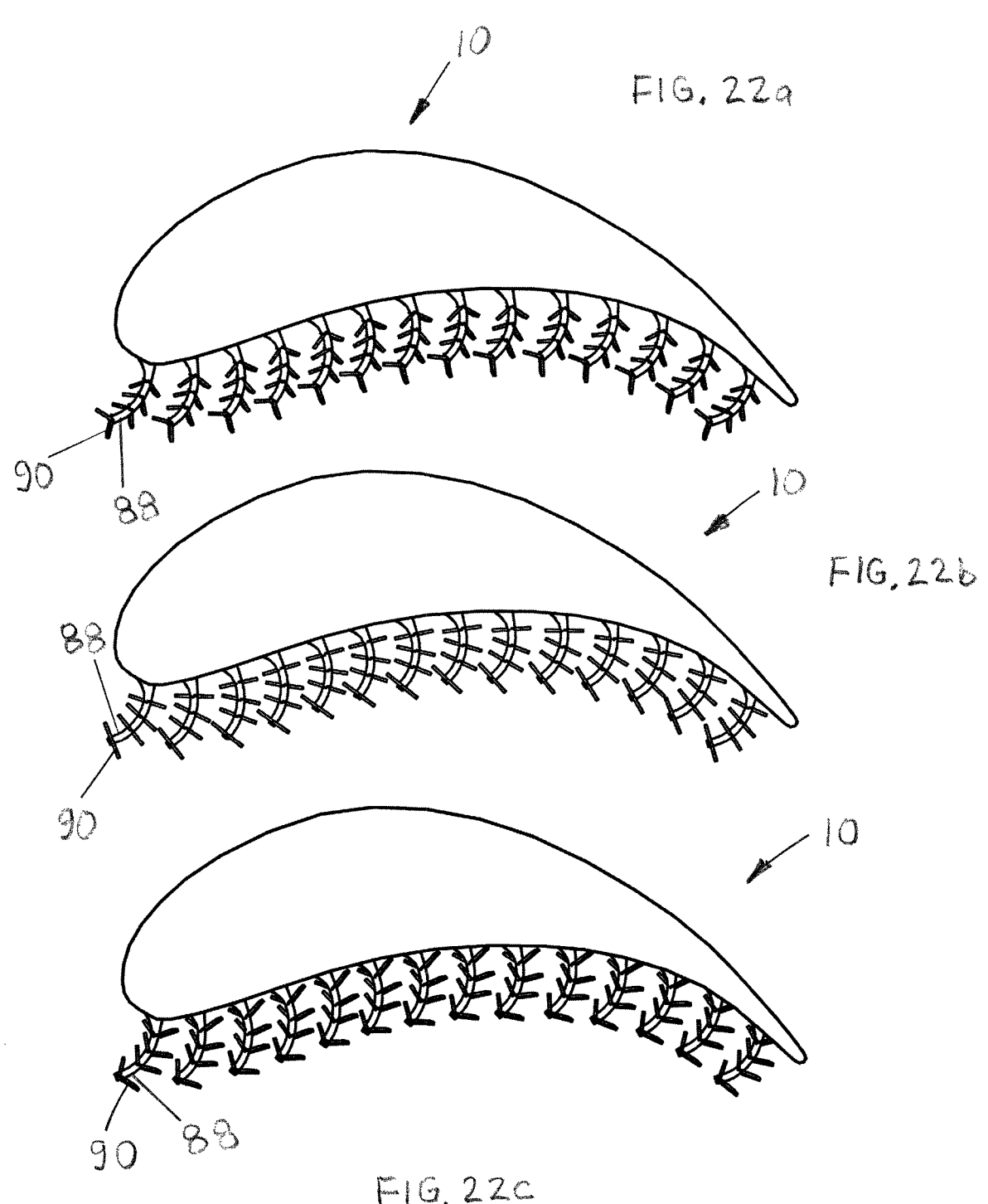

FIG. 22*a* is an end view of a modular blade assembly with a plurality of fins and a plurality of sub fins attached to each fin, a mechanism is used to change a position of the plurality of sub fins relative to each fin, where the plurality of sub fins are in a first position relative to each fin in accordance with the present invention.

FIG. 22*b* is an end view of a modular blade assembly with a plurality of fins and a plurality of sub fins attached to each fin, a mechanism is used to change a position of the plurality of sub fins relative to each fin, where the plurality of sub fins are in a second position relative to each fin in accordance with the present invention.

FIG. 22*c* is an end view of a modular blade assembly with a plurality of fins and a plurality of sub fins attached to each fin, a mechanism is used to change a position of the plurality of sub fins relative to each fin, where the plurality of sub fins are in a third position relative to each fin in accordance with the present invention.

Figures 23A, 23B:
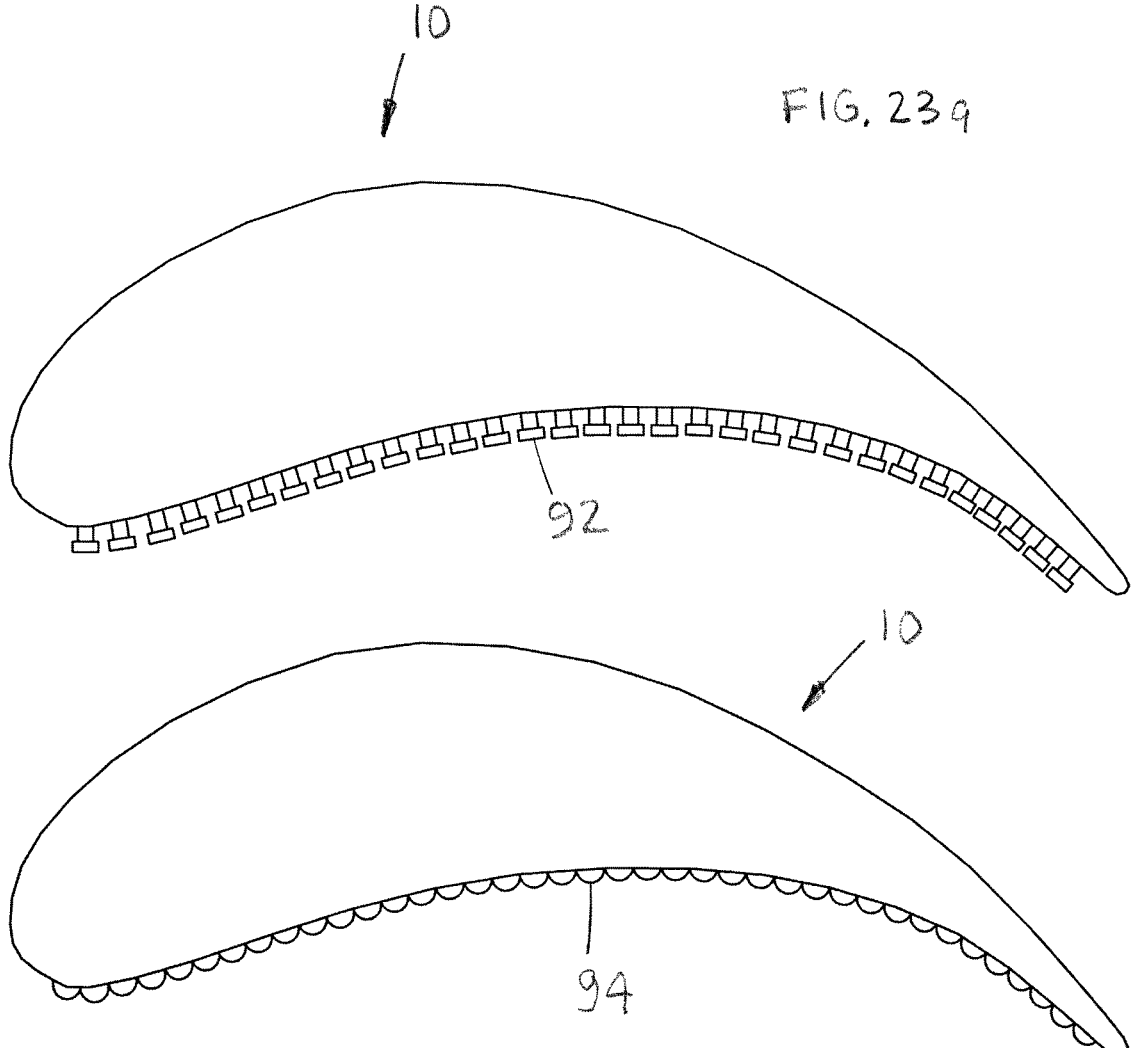

FIG. 23*a* is an end view of a modular blade assembly having a bottom surface with a plurality of "T" projections formed thereupon in accordance with the present invention.

FIG. 23*b* is an end view of a modular blade assembly having a bottom surface with a plurality of convex projections formed thereupon in accordance with the present invention.

Figure 23C:
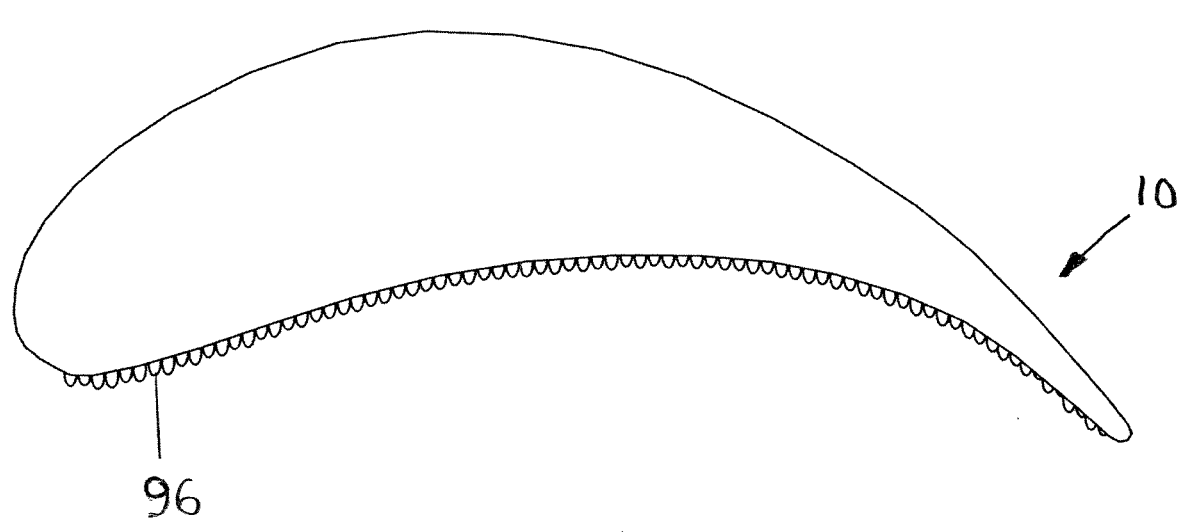

FIG. 23*c* is an end view of a modular blade assembly having a bottom surface with a plurality of convex projections formed thereupon having a different shape than those shown in FIG. 23*b* in accordance with the present invention.

Figure 24Q:
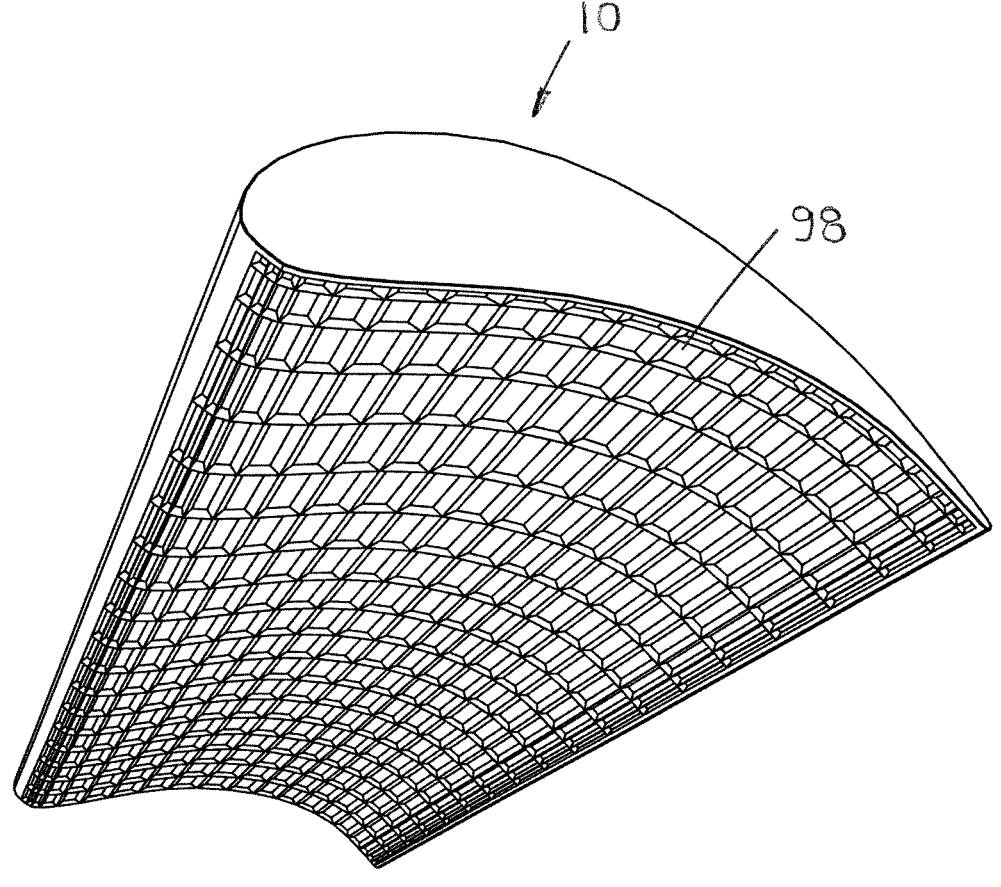

FIG. 24*a* is a bottom perspective view of a modular blade assembly having a pattern of a plurality of trapezoidal cavities formed in a bottom surface thereof in accordance with the present invention.

Figures 24B, 24C:
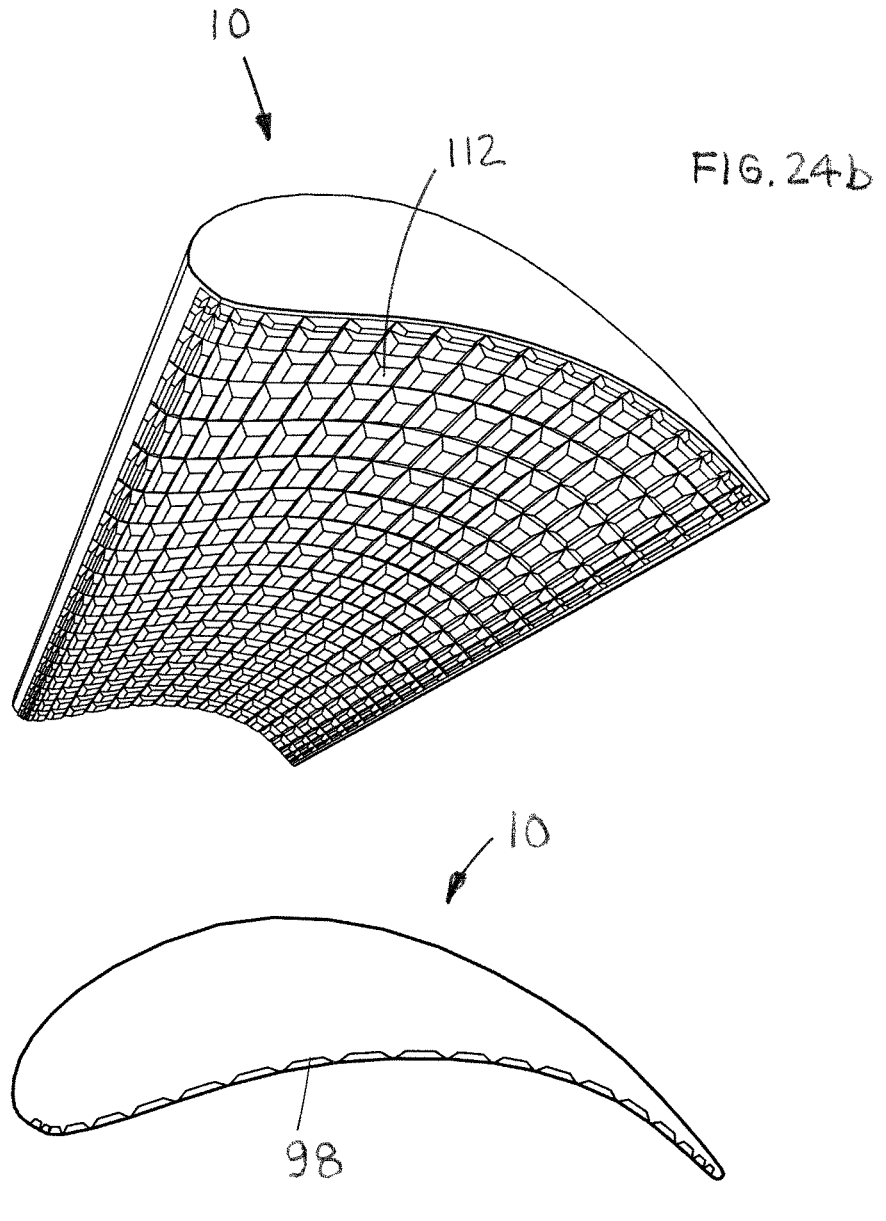

FIG. 24*b* is a bottom perspective view of a modular blade assembly having a pattern of a plurality of trapezoidal projections formed in a bottom surface thereof in accordance with the present invention.

FIG. 24*c* is an end view of a modular blade assembly having a pattern of a plurality of trapezoidal cavities formed in a bottom surface thereof in accordance with the present invention.

FIG. 24*d* is a bottom perspective view of a modular blade assembly having a pattern of a plurality of trapezoidal projections formed in a bottom surface thereof with a trapezoidal cavity formed in each trapezoidal projection in accordance with the present invention.

Figures 25A, 25B:
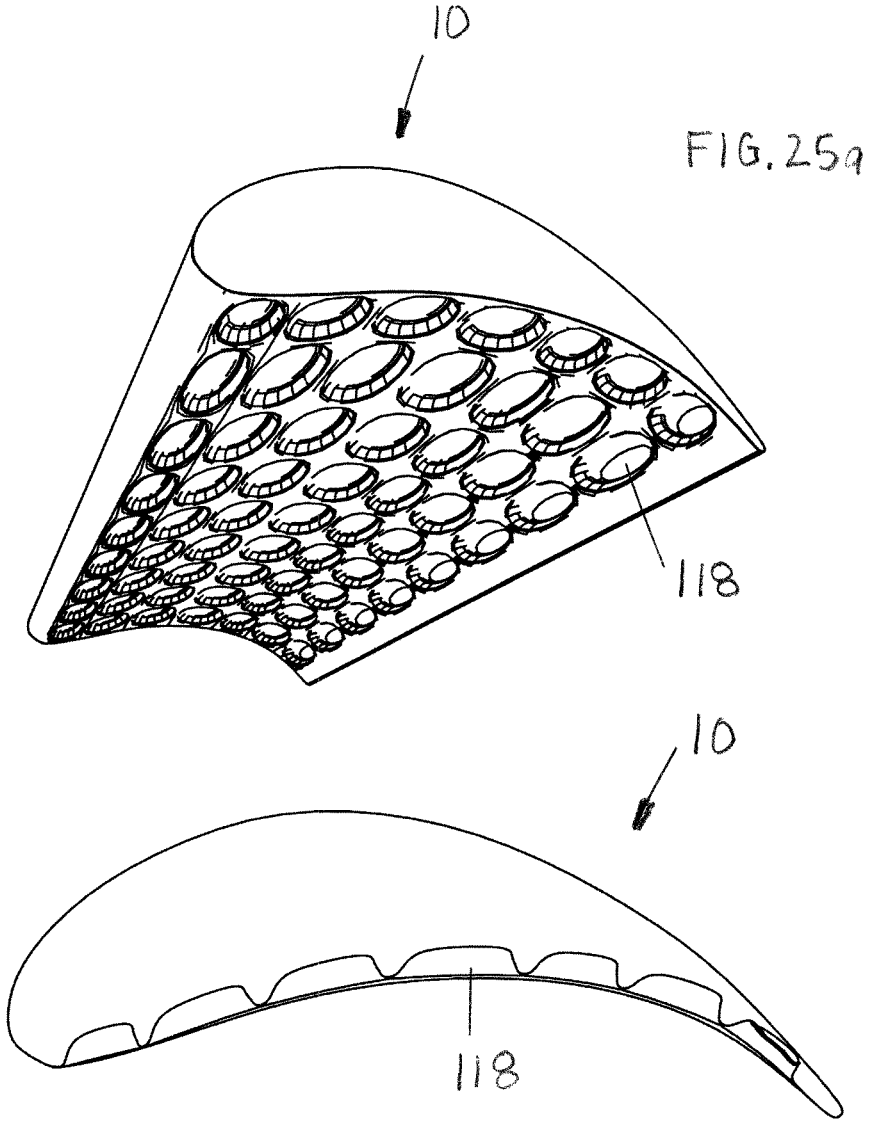

FIG. 25*a* is a bottom perspective view of a modular blade assembly having a pattern of a plurality of circular cavities formed in a bottom surface thereof in accordance with the present invention.

FIG. 25*b* is an end view of a modular blade assembly having a pattern of a plurality of circular cavities formed in a bottom surface thereof in accordance with the present invention.

6

DETAILED DESCRIPTION OF THE PREFERRED EMBODIMENTS

With reference now to the drawings, and particularly to FIGS. 5-10, there is shown modular wind turbine blade designs.

Figure 1:
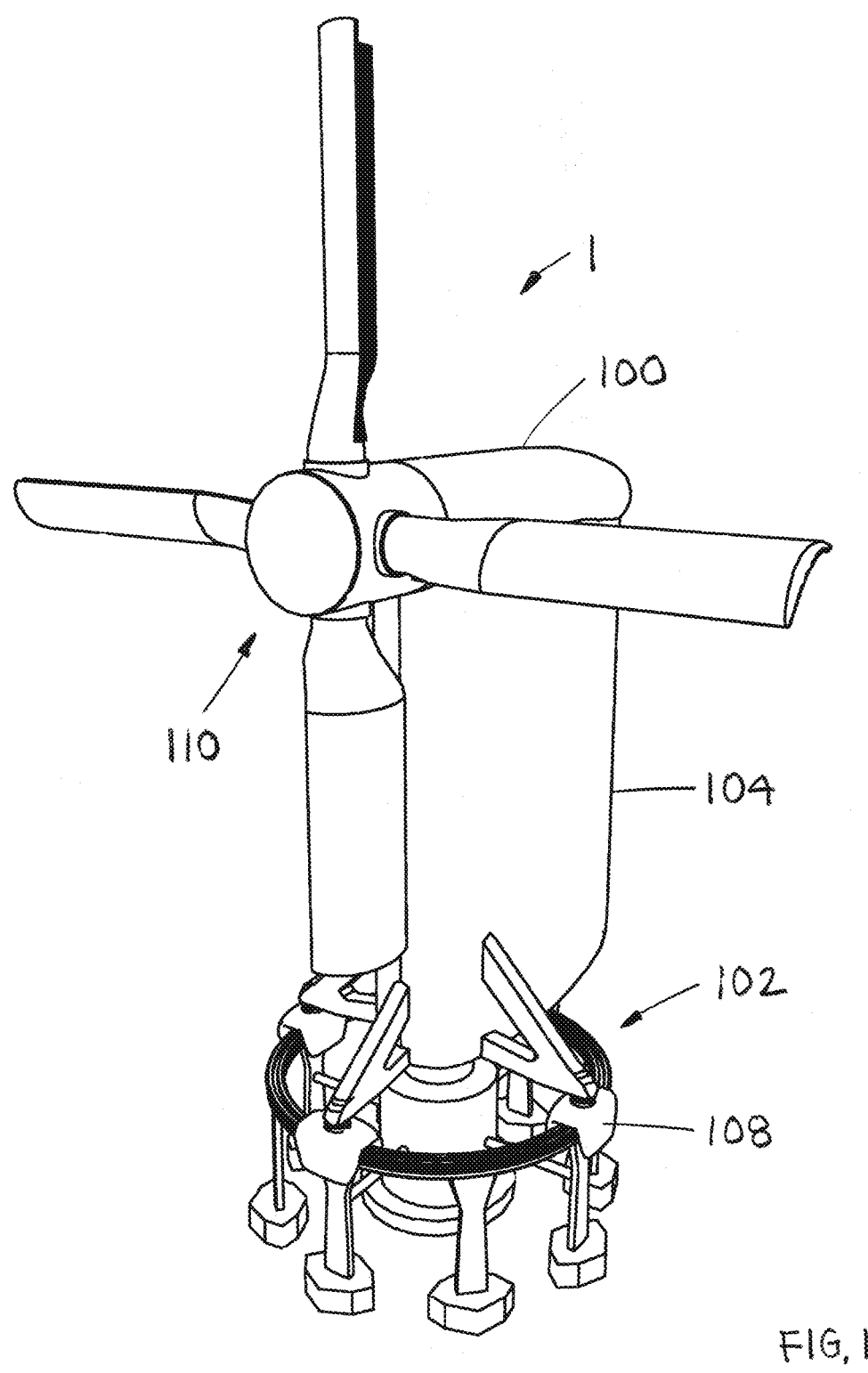
FIG. 1 is a perspective view of a wind turbine rotating tower in accordance with the present invention.
Figure 2:
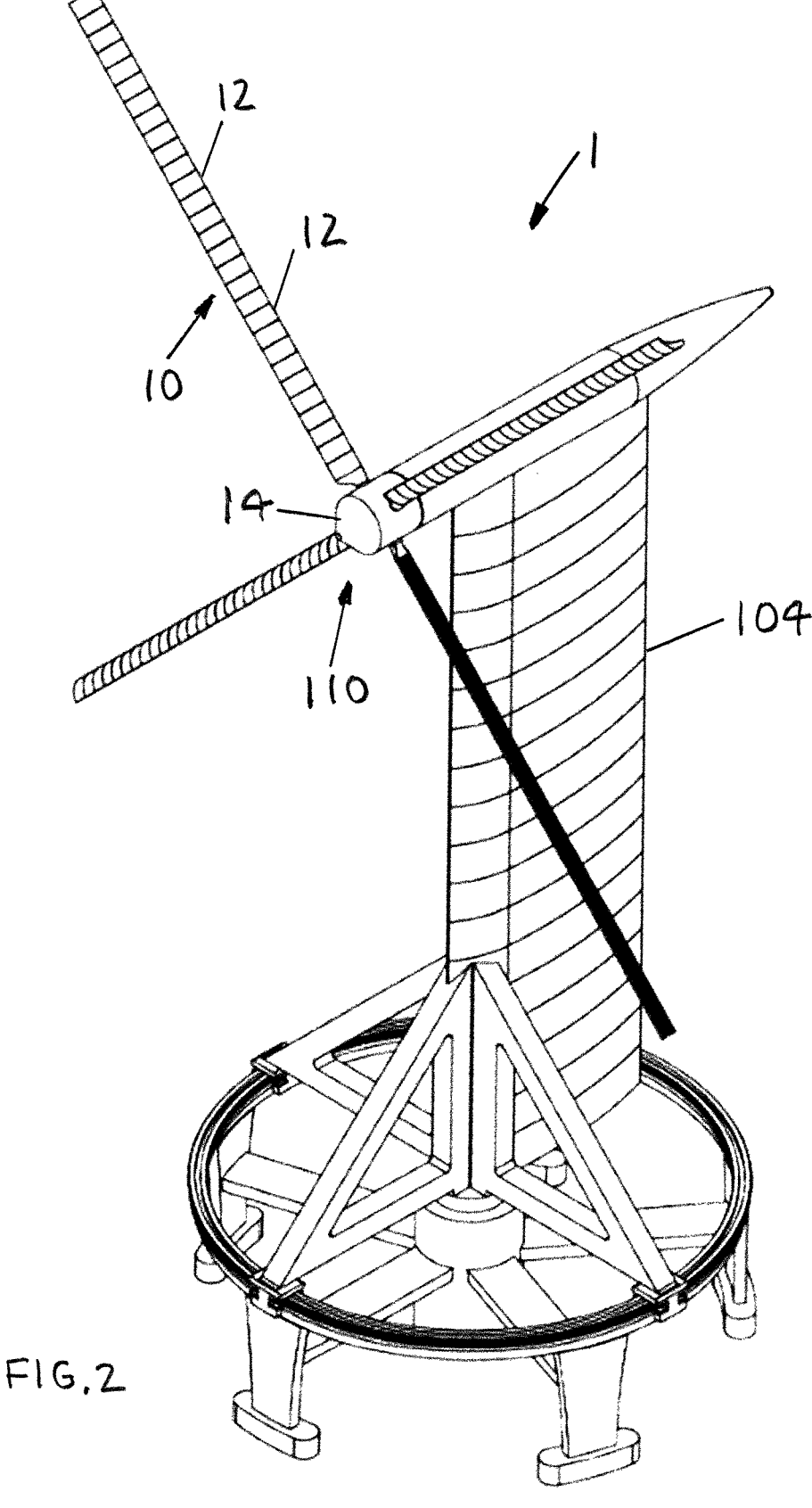
FIG. 2 is a perspective view of a wind turbine rotating tower with a symmetrical biconvex tower in accordance with the present invention.
Figure 3:
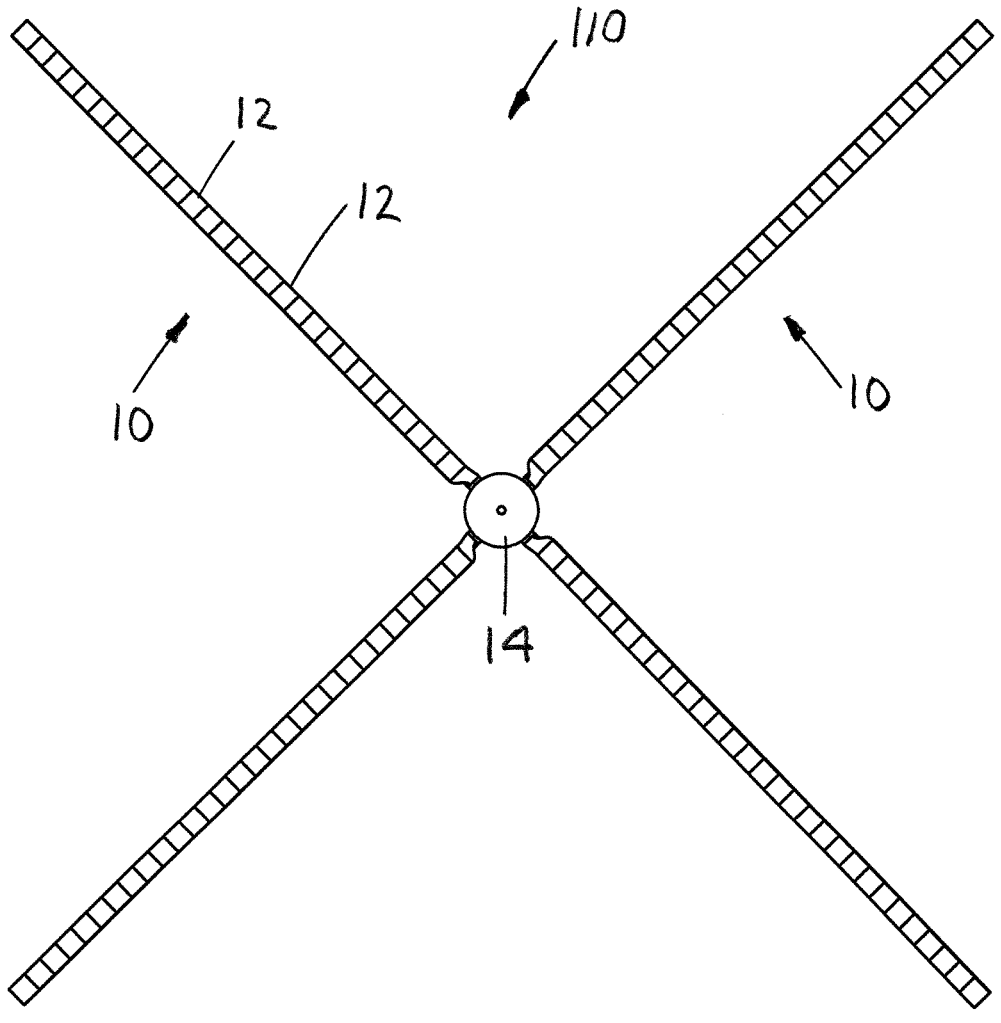
FIG. 3 is an end view of a blade assembly in accordance with the present invention.
Figure 4:
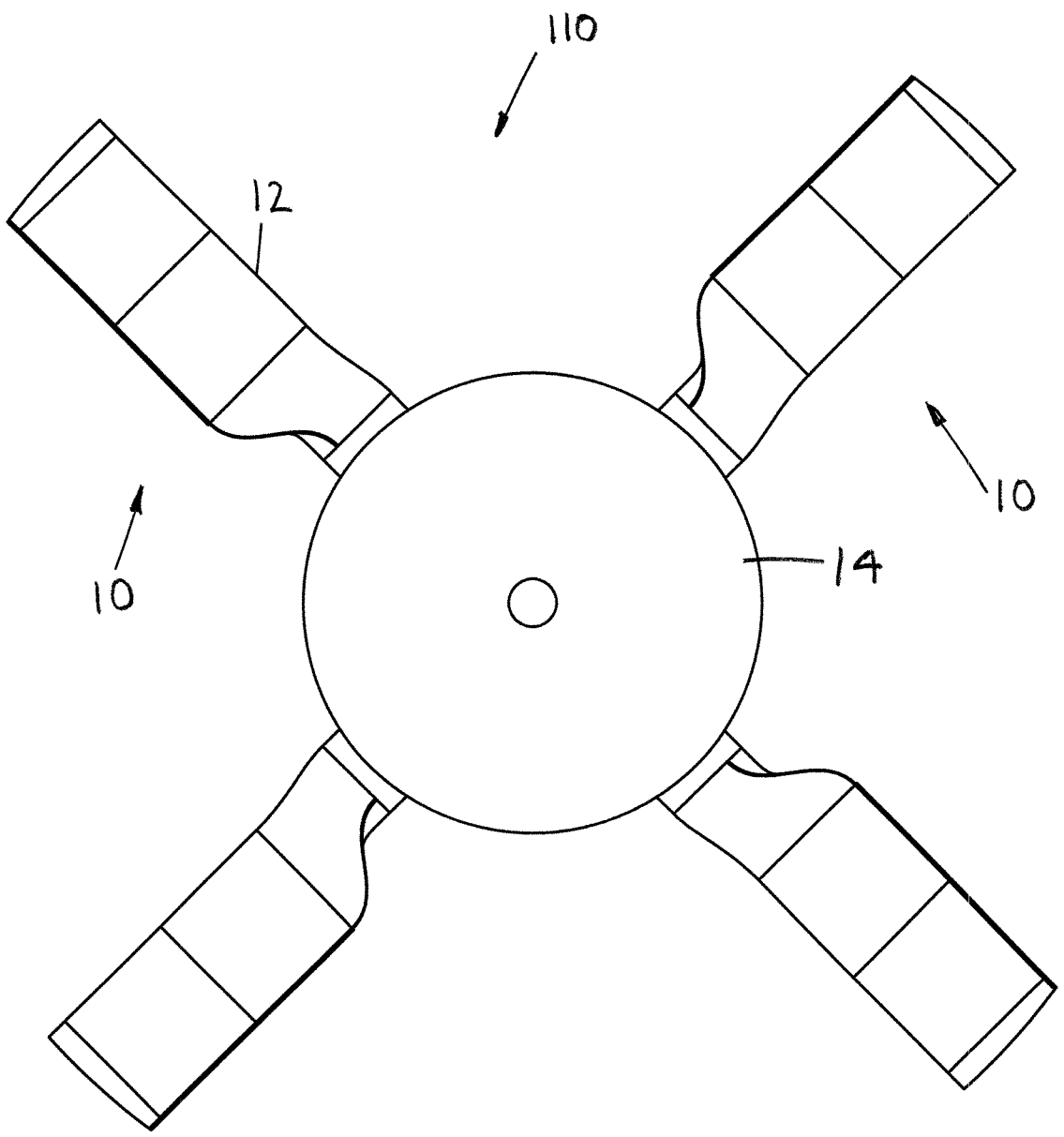
FIG. 4 is an end view of a blade assembly, which includes a plurality of modular blade assemblies in accordance with the present invention.

With reference to FIG. 1, a wind turbine rotating tower 1 preferably includes an adaptive nacelle 100, a stationary base 102, a rotating tower 104, a plurality of motor systems 108 and a blade assembly 110. The rotating tower 104 preferably includes a symmetrical biconvex shape. With reference to FIGS. 2-4, each blade assembly 110 preferably includes a plurality of modular blade assemblies 10 and a blade hub 14. The plurality of modular blade assemblies 10 extend from the blade hub 14. Each modular blade assembly 10 includes a plurality of modular sections 12 that are attached to each other on site.

Figure 5:
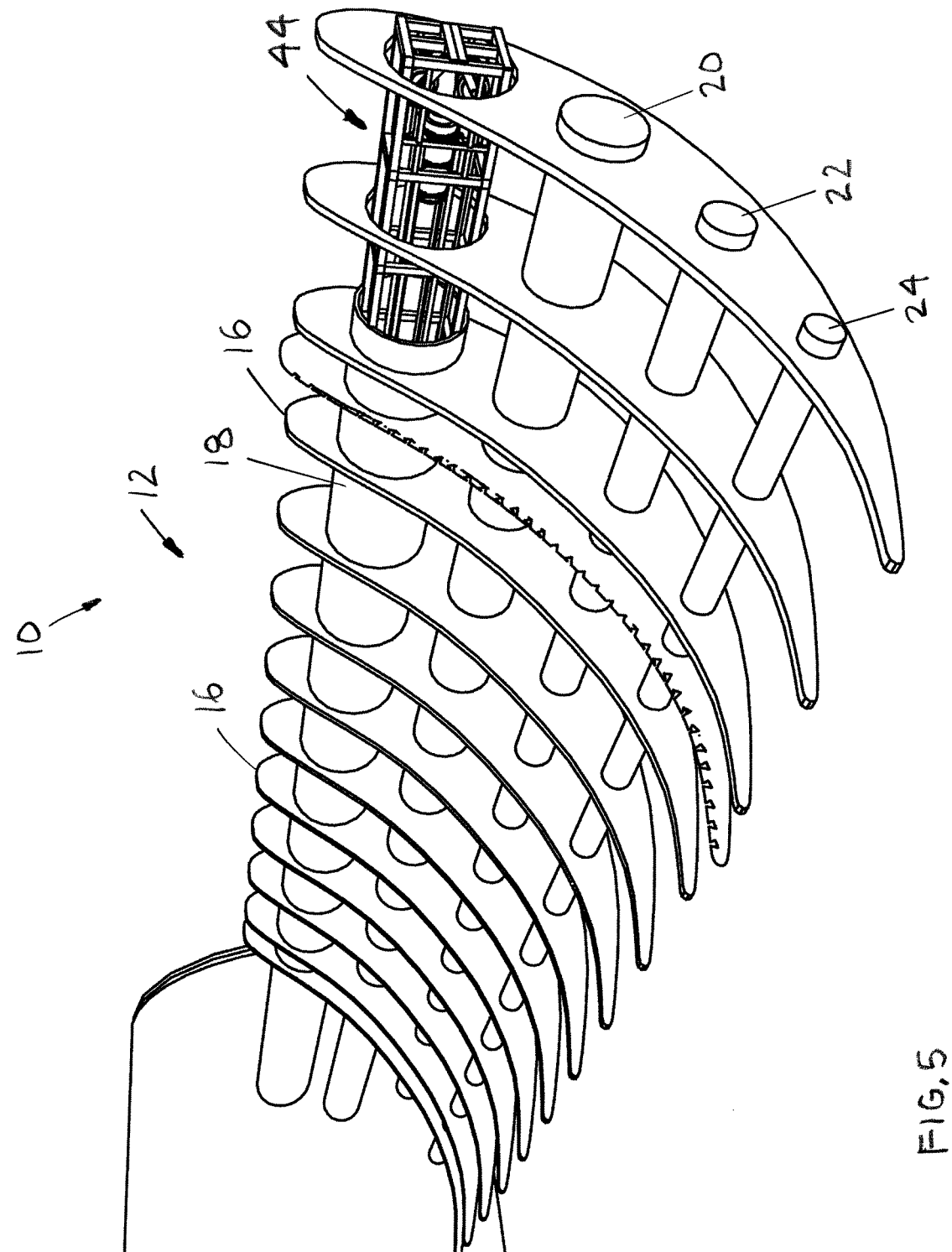
FIG. 5 is a perspective view of a modular blade assembly with an outer skin removed in accordance with the present invention.
Figure 6:
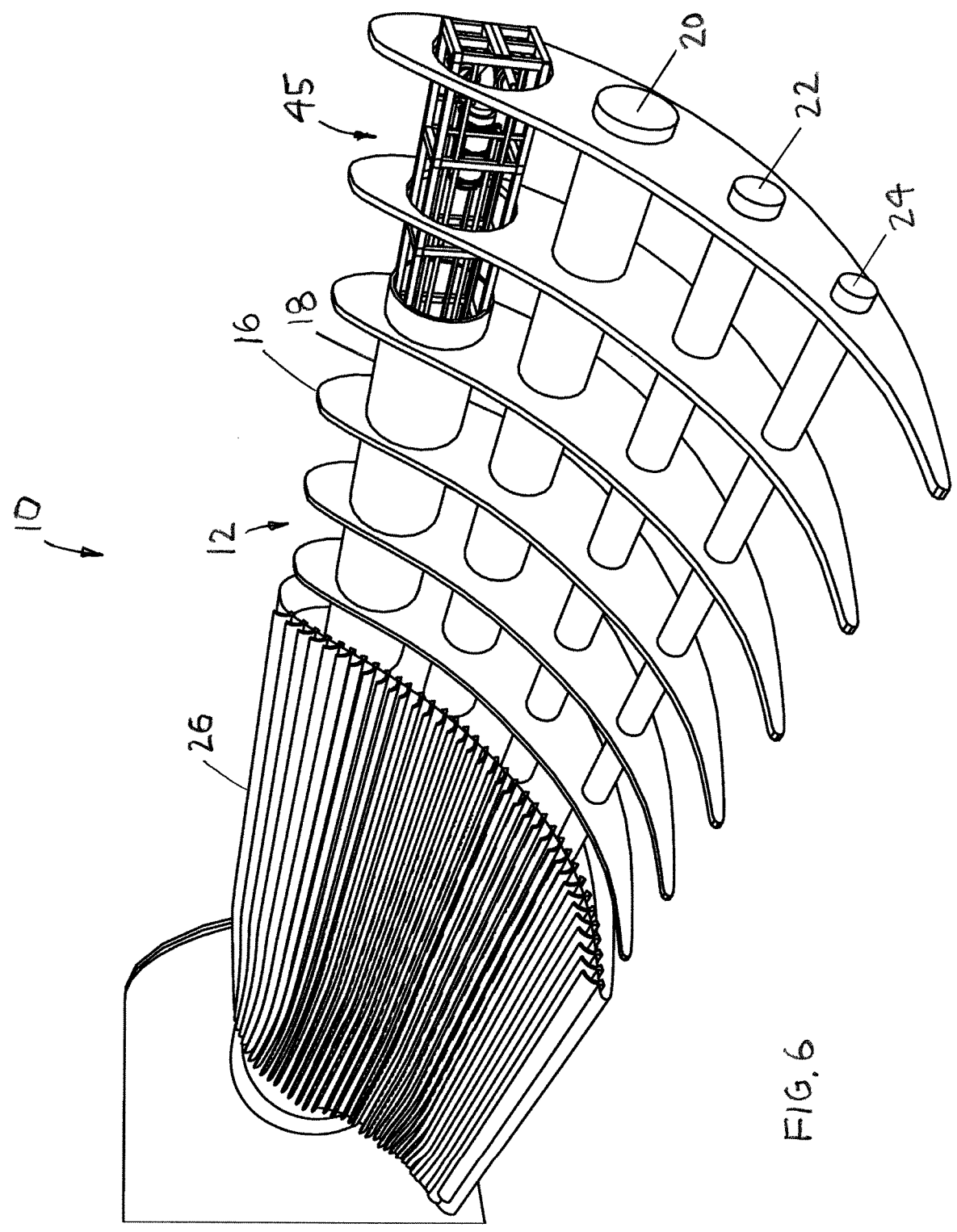
FIG. 6 is a partial cutaway perspective view of a modular blade assembly with a portion of an outer skin removed in accordance with the present invention.
Figure 7:
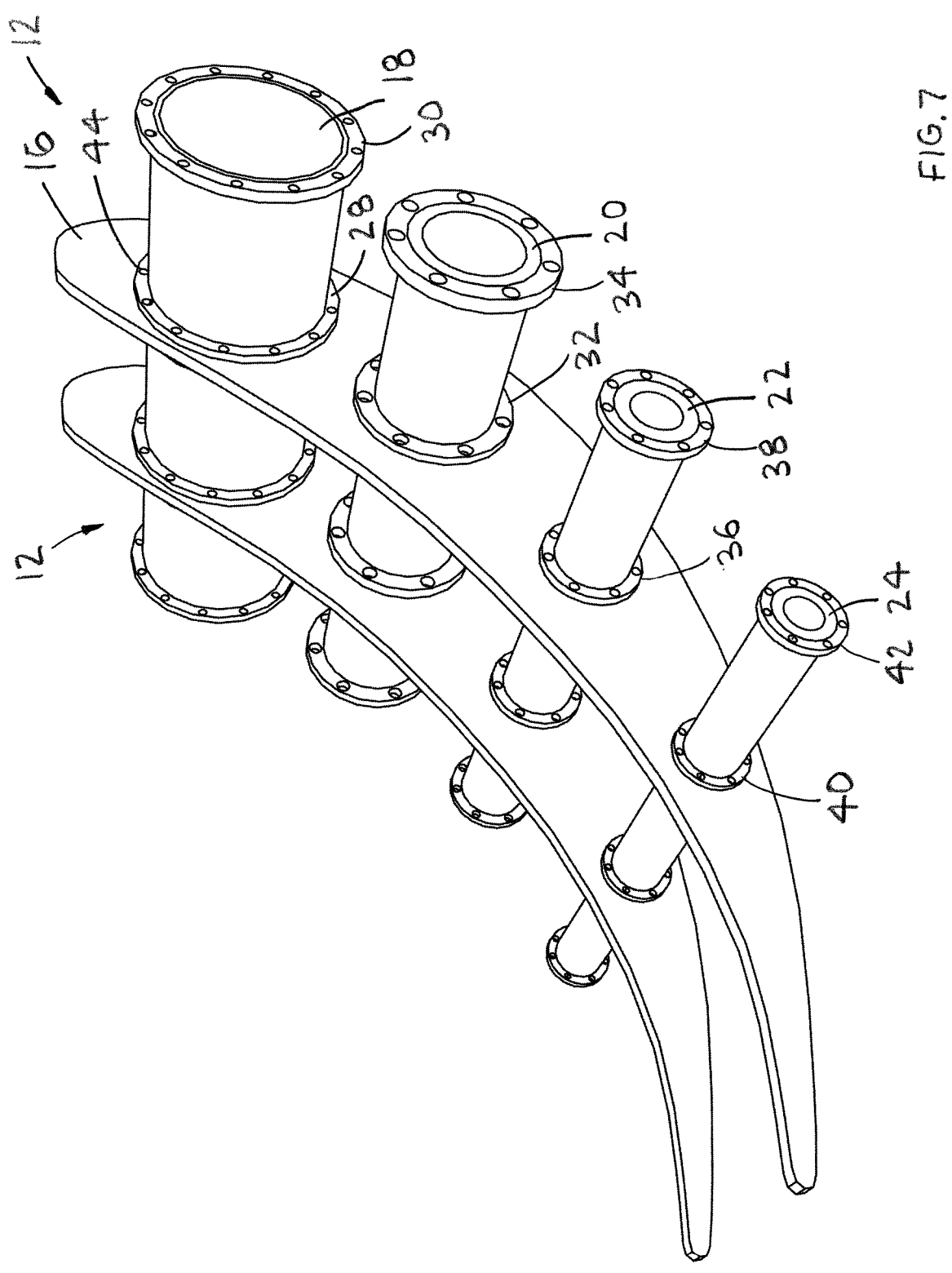
FIG. 7 is a right side perspective view of a portion of a modular blade assembly with an outer skin removed in accordance with the present invention.
Figure 8:
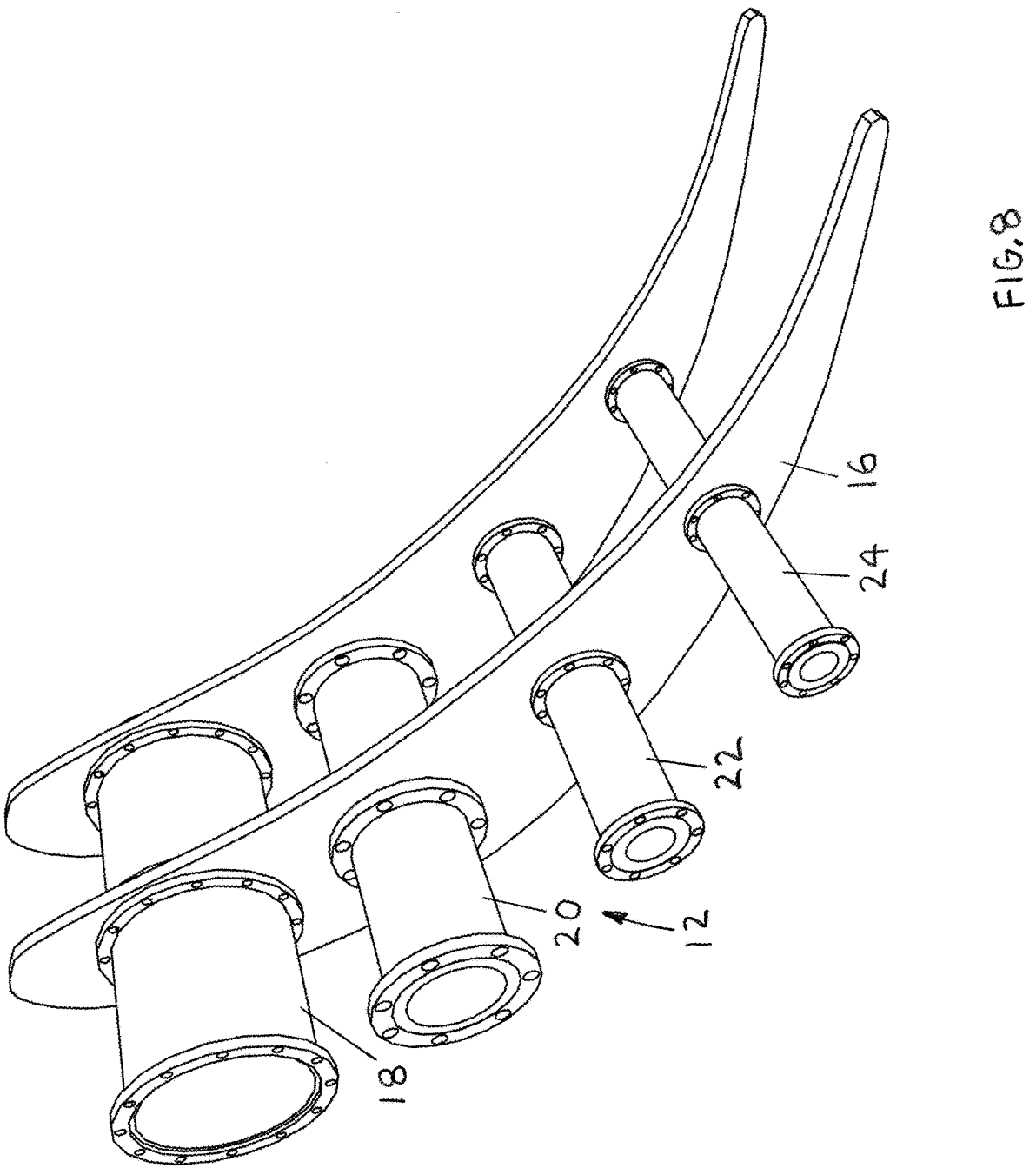
FIG. 8 is a left side perspective view of a portion of a modular blade assembly with an outer skin removed in accordance with the present invention.
Figure 9:
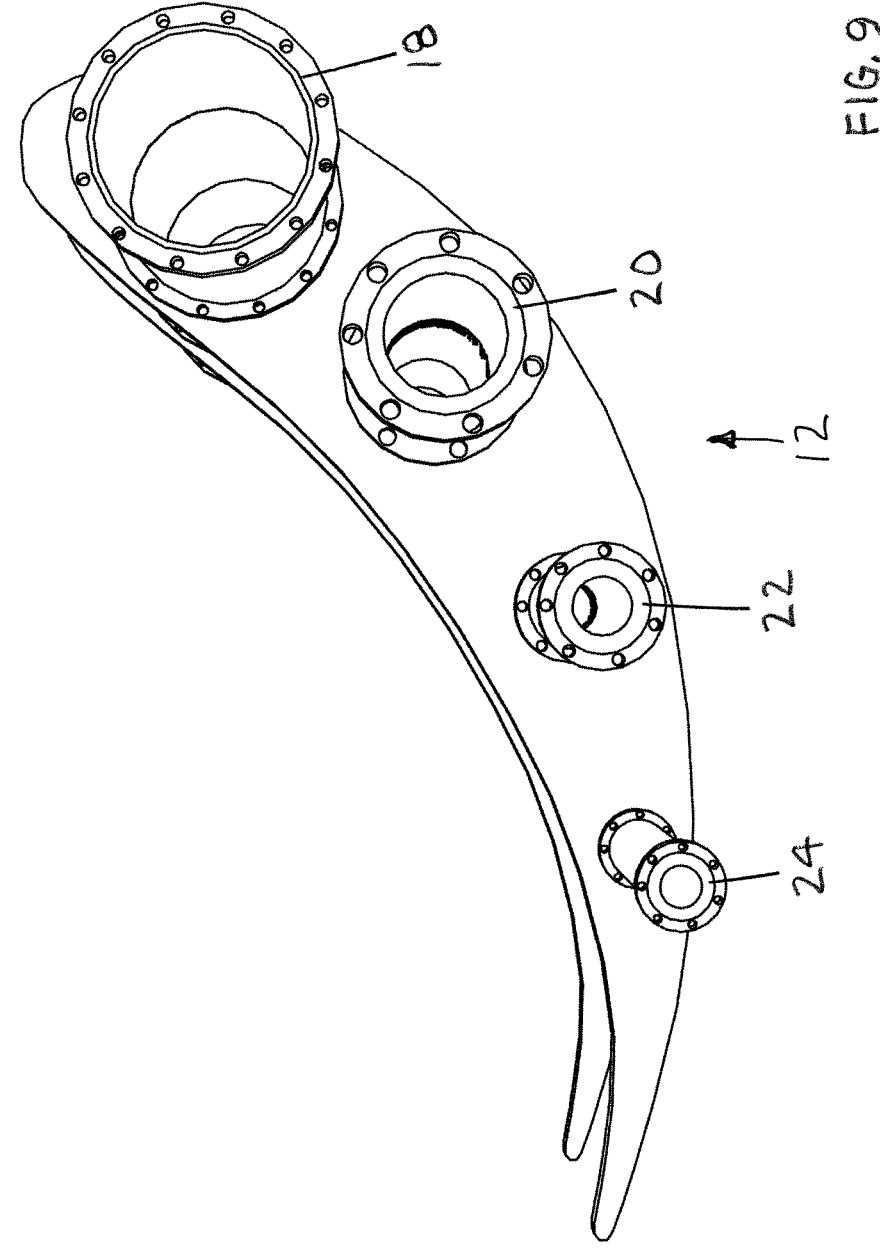
FIG. 9 is a side perspective view of a portion of a modular blade assembly with an outer skin removed in accordance with the present invention.
Figure 10:
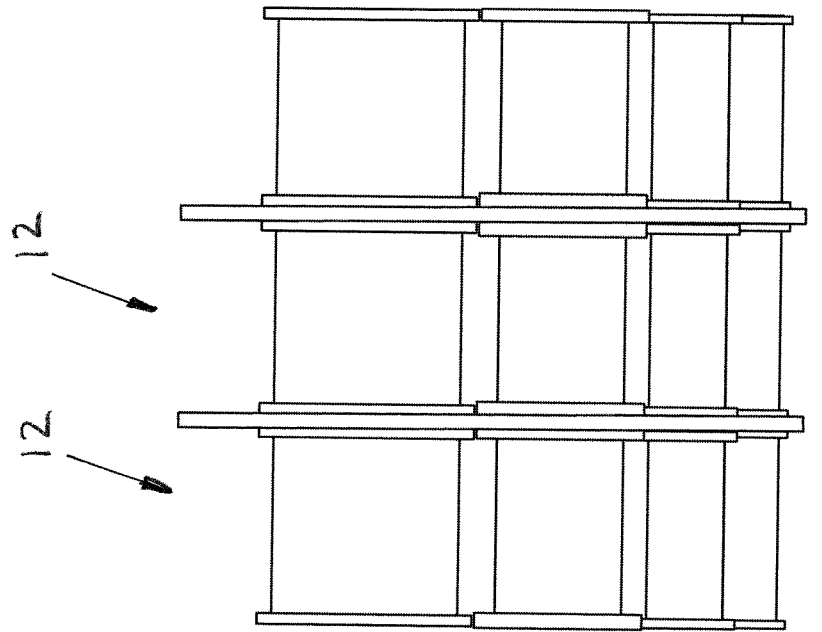
FIG. 10 is a top view of a portion of a modular blade assembly with an outer skin removed in accordance with the present invention.

With reference to FIGS. 5-6, each modular blade assembly 10 preferably includes a plurality of sections 12. Each modular section 12 preferably includes a cross member 16, a first lengthwise member 18, a second lengthwise member 20, a third lengthwise member 22, a fourth lengthwise member 24. The plurality of modular sections 12 are joined to each other to form a blade frame. An outer skin 26 is secured to an outer perimeter of the plurality of sections 12 with any suitable method. Each cross member 16 preferably includes a curved tear drop outer perimeter shape, but other shapes may also be used. The outer perimeter shape is optimized to be driven by the wind. The first, second, third and further lengthwise members 18, 20, 22, 24 are preferably tubular and have a round outer perimeter.

With reference to FIGS. 7-10, the first lengthwise member 18 includes a first end flange 28 and a first opposing end flange 30. The second lengthwise member 20 includes a second end flange 32 and a second opposing end flange 34. The third lengthwise member 22 includes a third end flange 36 and a third opposing end flange 38. The fourth lengthwise member 24 includes a fourth end flange 40 and a fourth opposing end flange 42. A plurality of fasteners 44 are used to secure a cross member 16 between an opposing end flange 30, 34, 38 and 42 of one set of lengthwise members 18, 20, 22, 24 to end flanges 28, 32, 36, 40 of a second set of lengthwise members 18, 20, 22, 24. The fasteners could be threaded bolts, rivets or any other suitable fastener.

Figure 11:
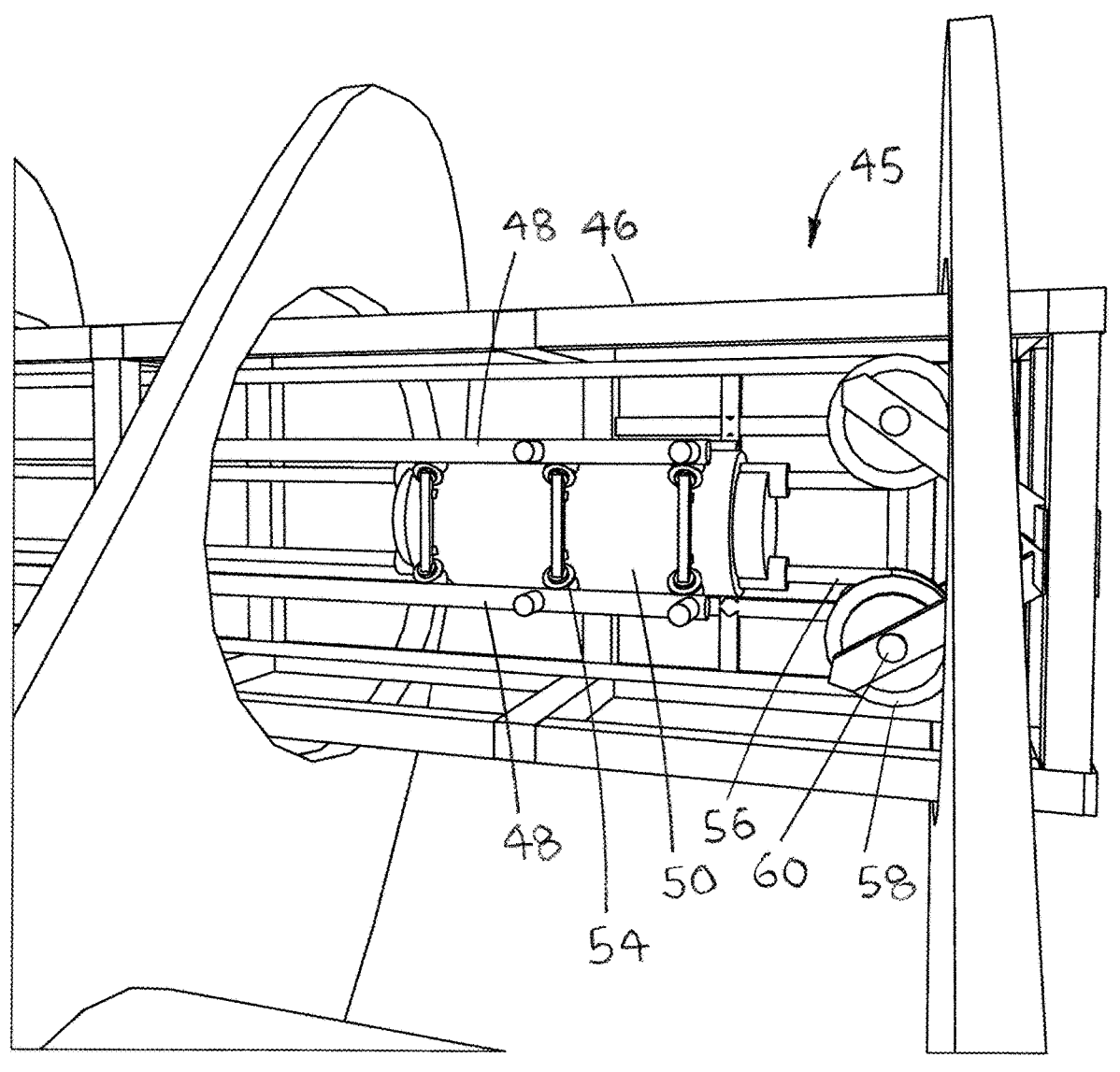
FIG. 11 is a perspective view of a portion of a modular blade assembly with an outer skin removed and revealing a weight system in accordance with the present invention.
Figure 12:
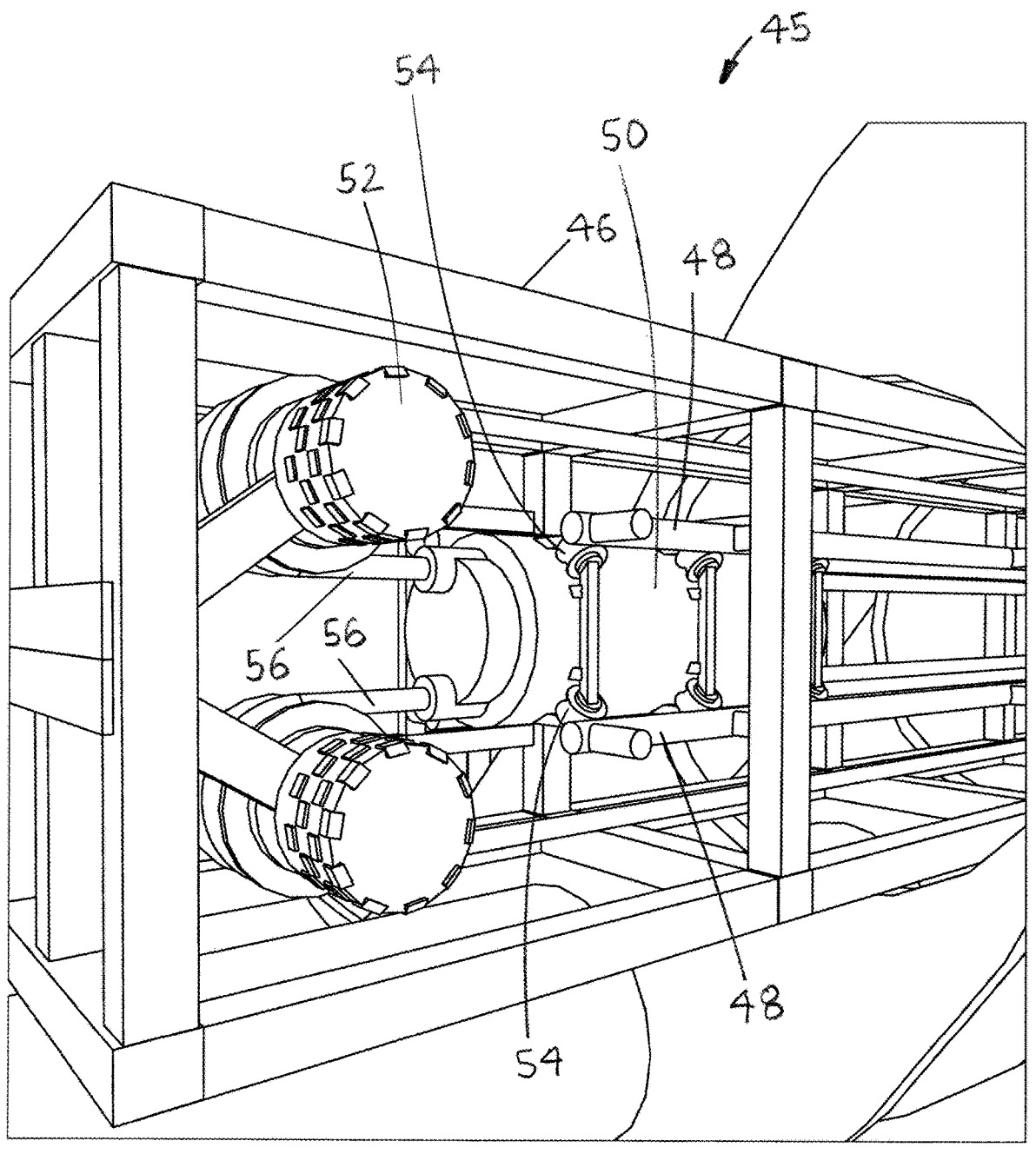
FIG. 12 is a perspective view of a section of a frame of a modular blade assembly with an outer skin removed and revealing a weight system run by cables and pulleys in accordance with the present invention.
Figure 13:
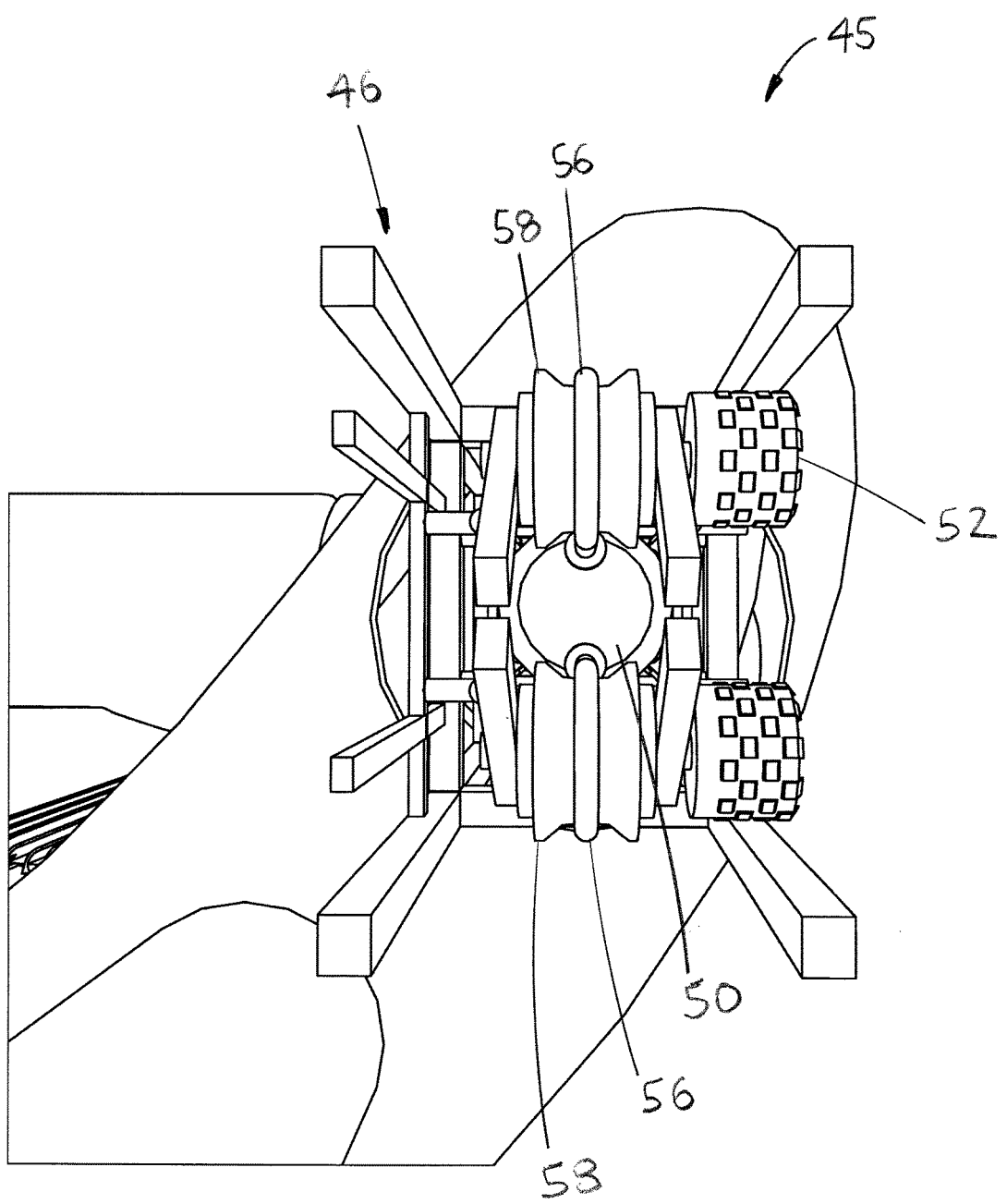
FIG. 13 is an end view of a section of a frame of a modular blade assembly with an outer skin removed and revealing a weight system run by cables and pulleys in accordance with the present invention.
Figure 14:
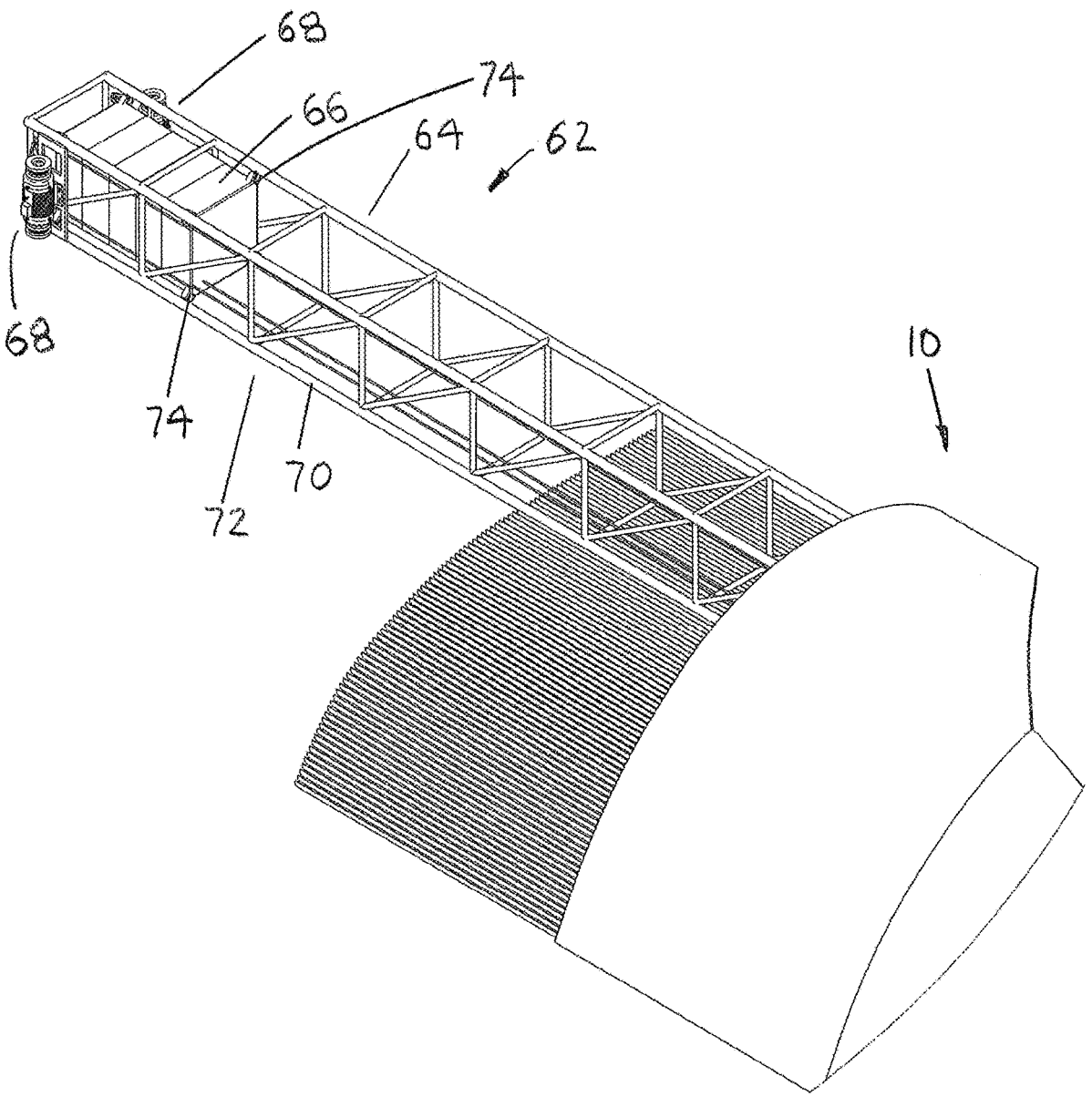
FIG. 14 is a perspective view of a modular blade assembly with a frame removed to reveal a frame of a second embodiment of a weight system run by cables and pulleys in accordance with the present invention.
Figure 15:
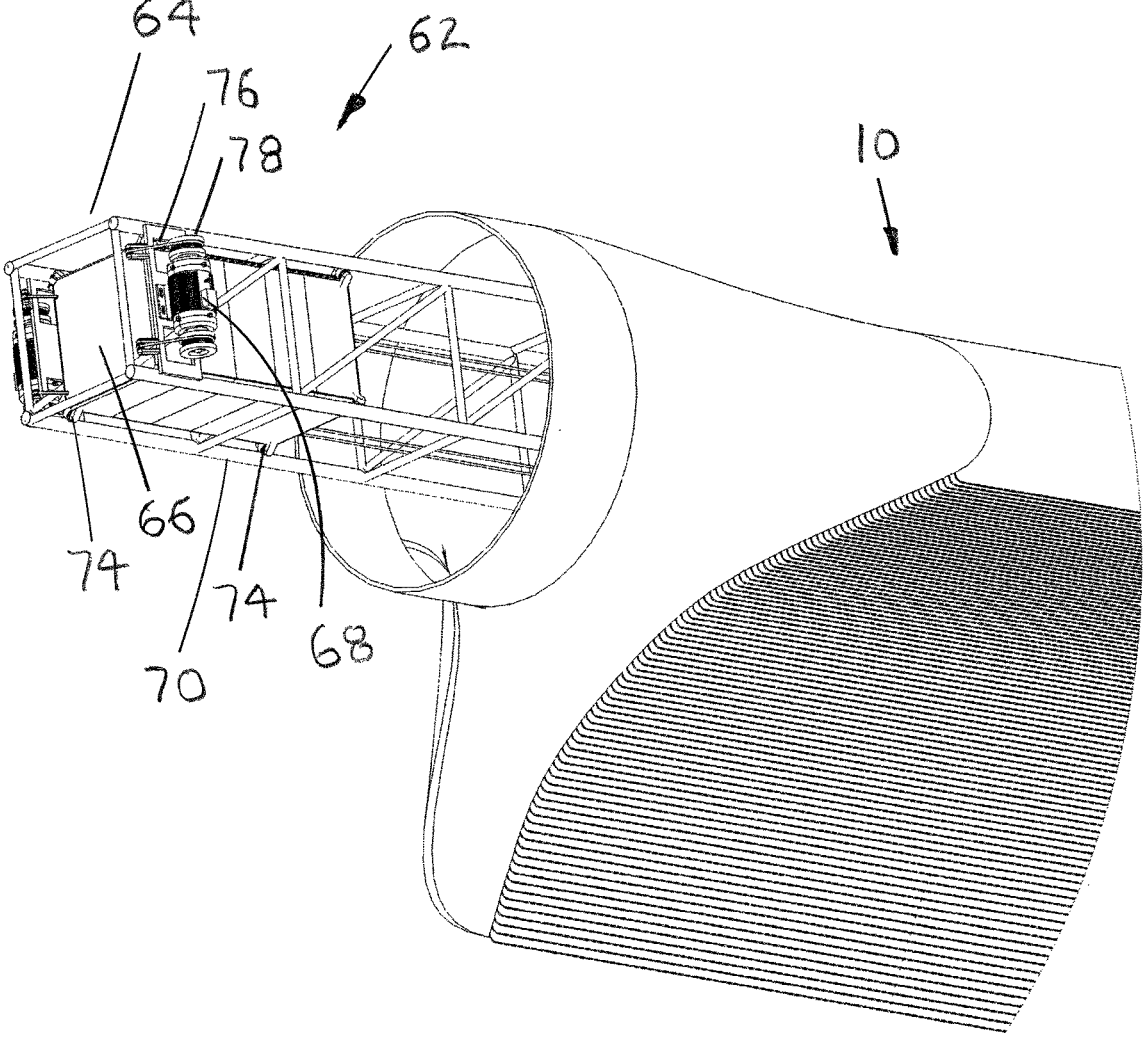
FIG. 15 is a cutaway perspective view of a modular blade assembly revealing an end of a frame of a second embodiment of a weight system run by cables and pulleys in accordance with the present invention.
Figure 16:
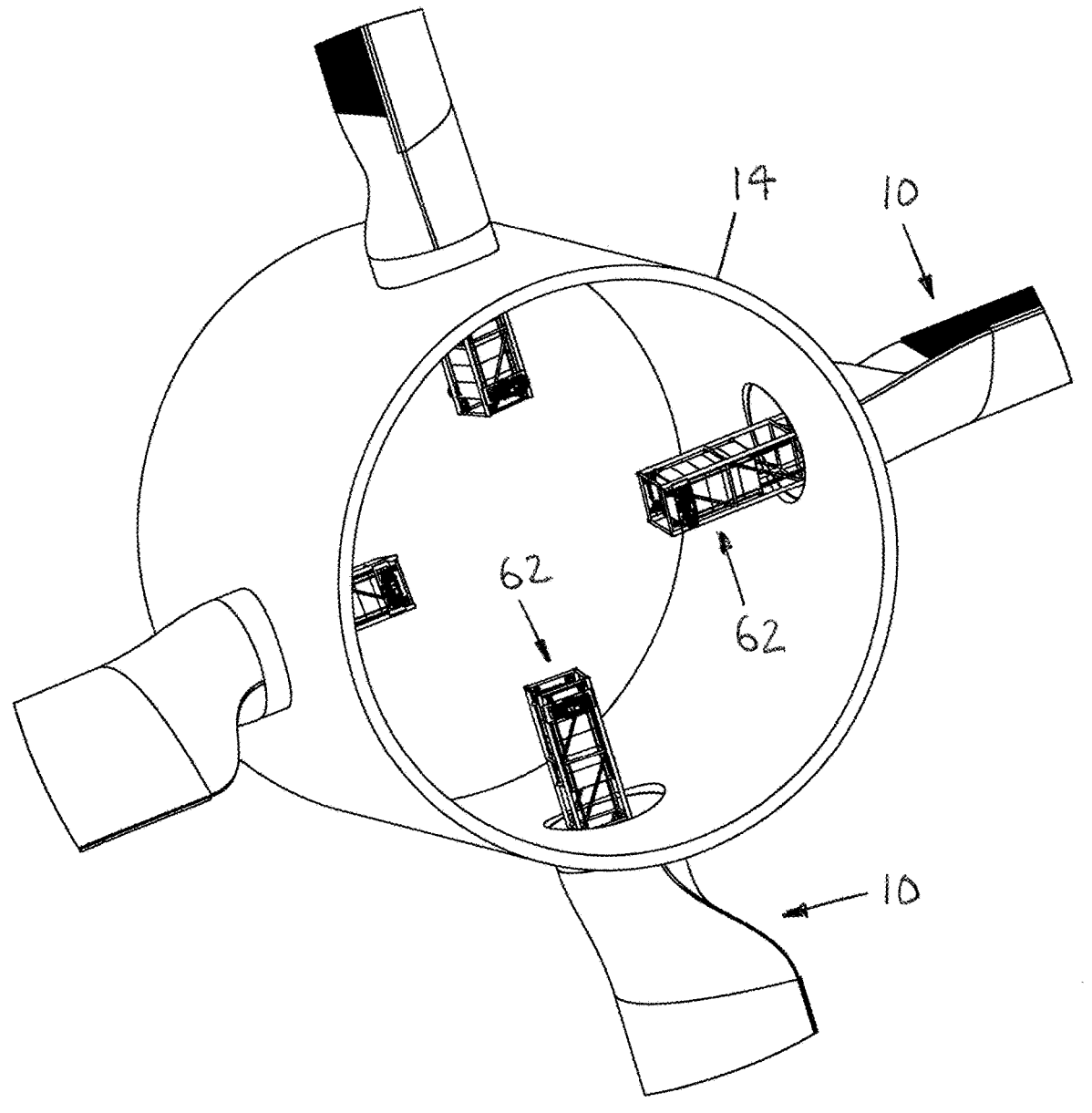
FIG. 16 is a perspective end view of an inside of a blade hub of a modular blade assembly revealing ends of a frame of a second embodiment of four weight systems run by cables and pulleys for four turbine blades in accordance with the present invention.
Figure 17:
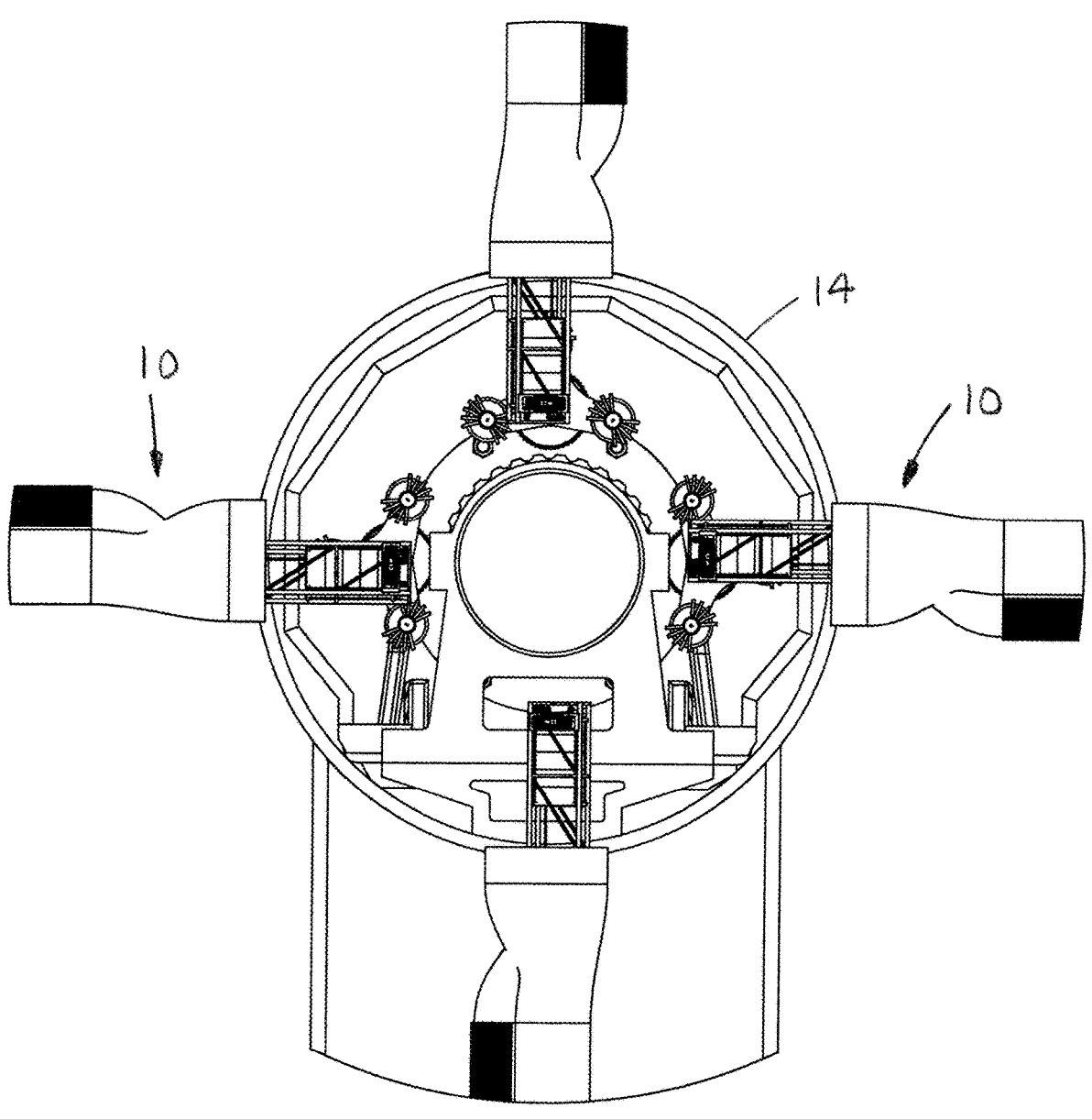
FIG. 17 is an end view of an inside of a blade hub of a modular blade assembly revealing ends of a frame of a second embodiment of four weight systems run by cables and pulleys for four turbine blades and an inside of a nacelle with a blade shaft in accordance with the present invention.
Figure 18:
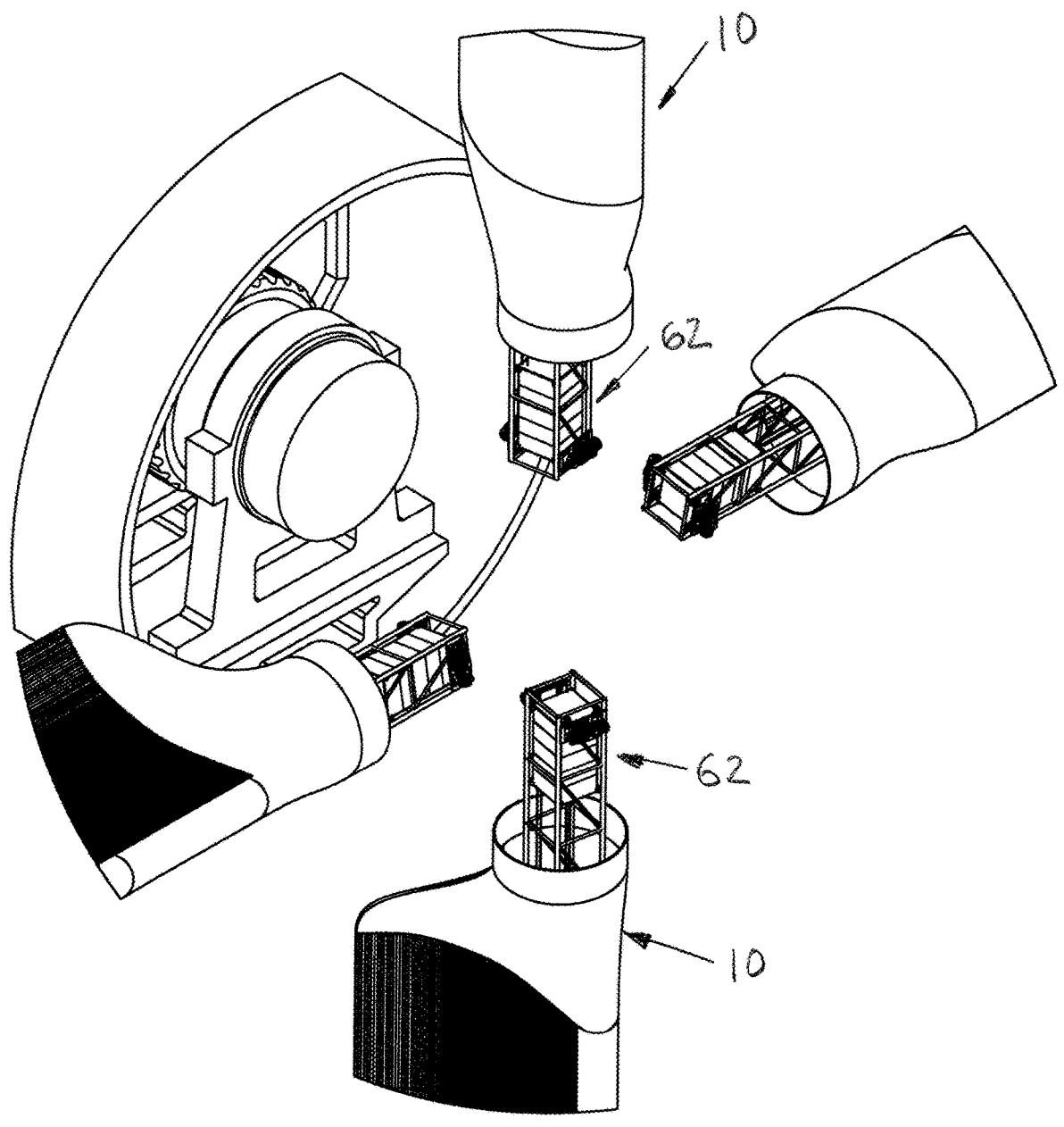
FIG. 18 is a partially exploded perspective view of an inside of a blade hub of a modular blade assembly revealing ends of a frame of a second embodiment of four weight systems run by cables and pulleys for four turbine blades and an inside of a nacelle with a blade shaft in accordance with the present invention.

With reference to FIGS. 11-13, a first embodiment of a weight system 45 is preferably retained in an inner perimeter of the plurality of first lengthwise members 18. The weight system 45 preferably includes a lengthwise frame 46, a rail structure 48, a sliding weight 50 and at least two weight motors 52. An outer perimeter of the lengthwise frame 46 is sized to be retained in the plurality of first length members 18. The rail structure 48 is retained in the lengthwise frame 46. The sliding weight 50 includes a plurality of wheels 54, which ride along the rail structure 48. The sliding weight 50 is slidably retained in the rail structure 48. One end of a first cable 56 is attached to the sliding weight 50 and other end of the first cable 56 is attached to a motor pulley 58, which is retained on an output shaft 60 of one of the at least two weight motors 52. A cable pulley (not shown) is located, at an opposing end of the lengthwise frame 46. A second cable 56 is looped around the cable pulley. One end of the second cable 56 is attached to the sliding weight 50 and the other end is attached to a second motor pulley 58. The two weight motors 52 always keep the two cables 56 in tension, regardless of the angular position of the modular blade assembly 10. The at least two weight motors 52 are rotated to change a position of the sliding weight 50 relative to the lengthwise frame 46. The at least two weight motors 52 may be driven by electricity, hydraulics or pneumatics. At start-up of rotation of the blade assembly 110, the sliding weight 50 may be located closest to the blade hub 14 to consume less energy. During full rotation of the blade assembly 110, the sliding weight 110 may be located at a distal end of each modular blade 10 to create a flywheel effect.

With reference to FIGS. 14-18, a second embodiment of a weight system 62 is preferably retained in an inner perimeter of the plurality of first lengthwise members 18. The weight system 62 preferably includes a lengthwise frame 64, a sliding weight 66 and at least two weight motors 68. An outer perimeter of the lengthwise frame 64 and at least two weight motors 68 are sized to be retained in the plurality of first length members 18. A rail structure 72 is preferably formed on an inside surface of four lengthwise frame members 70. The sliding weight 66 includes a plurality of wheels 74, which ride along the four lengthwise frame members 70. One end of a first cable 76 is attached to the sliding weight 66 and other end of the cable 76 is attached to a motor pulley 78 retained on an output shaft of one of the at least two weight motors 68. A cable pulley (not shown) is located, at an opposing end of the lengthwise frame 64. A second cable 76 is looped around the cable pulley. One end of the second cable 76 is attached to the sliding weight 66 and the other end is attached to a second motor pulley 78. The two weight motors 68 keep the two cables 76 in tension at all times, regardless of the angular position of the modular blade assembly 10. The at least two weight motors 68 are rotated to change a position of the sliding weight 66 relative to the lengthwise frame 64. The at least two weight motors 68 may be driven by electricity, hydraulics or pneumatics. At start-up of rotation of the blade assembly 110, the sliding weight 66 may be located closest to the blade hub 14 to consume less energy. During full rotation of the blade assembly 110, the sliding weight 110 may be located at a distal end of each modular blade 10 to create a flywheel effect.

Figure 19A:
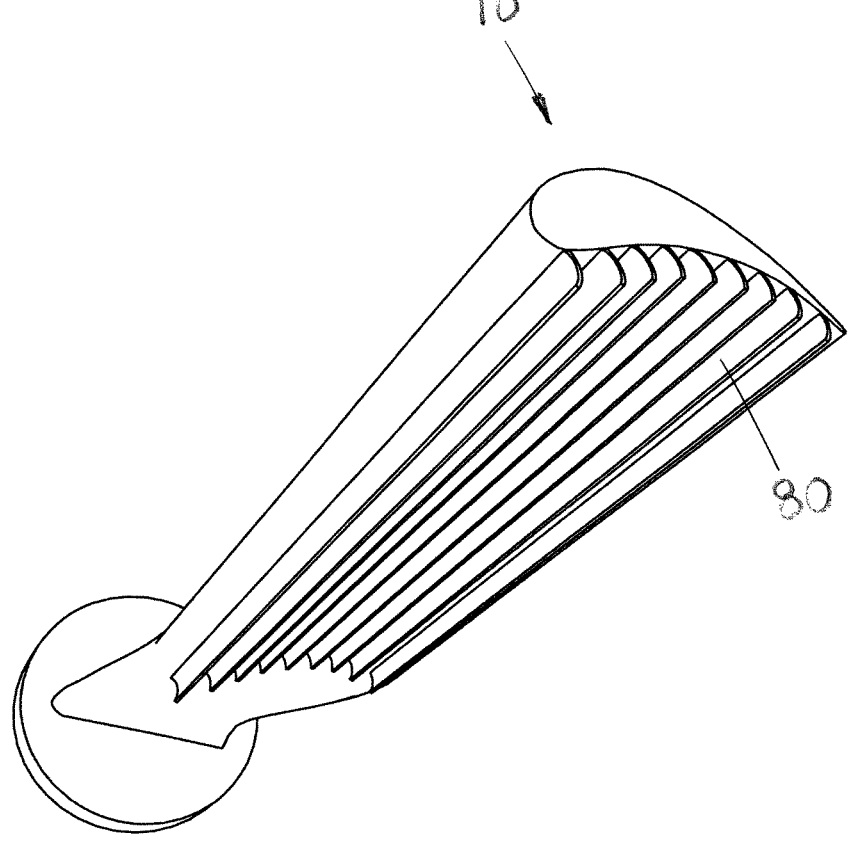
FIG. 19*a* is a perspective view of a modular blade assembly with a plurality of fins of the same size attached to a bottom surface thereof in accordance with the present invention.
Figure 19B:
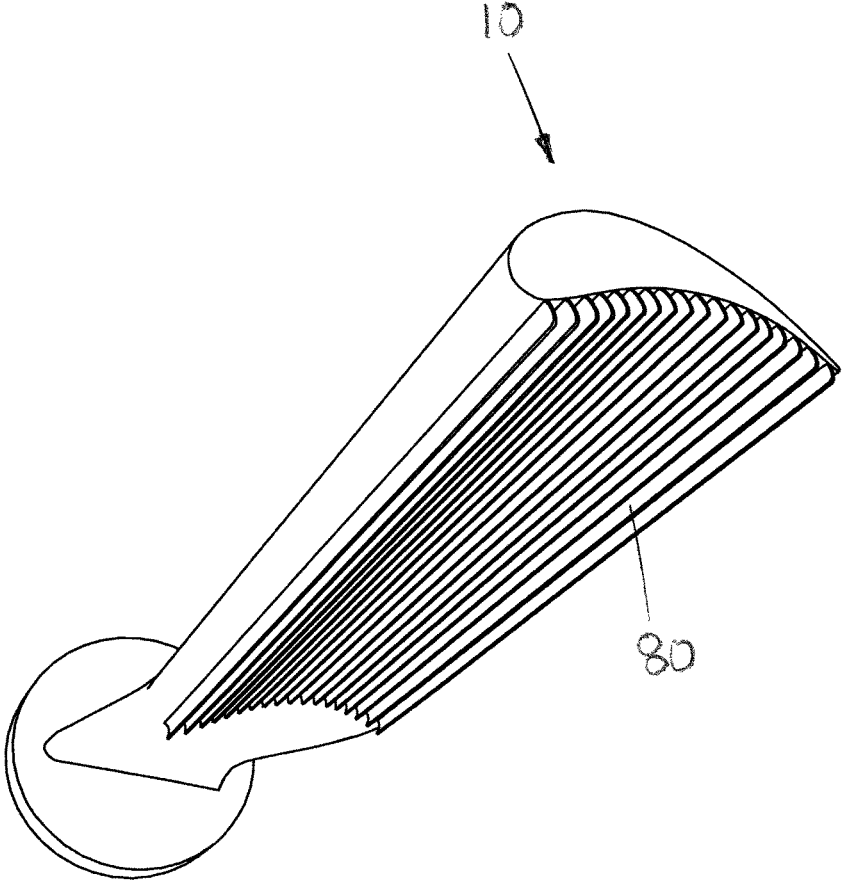
FIG. 19*b* is a perspective view of a modular blade assembly with a plurality of fins more densely packed than that of FIG. 19*a*, attached to a bottom surface thereof in accordance with the present invention.
Figure 19C:
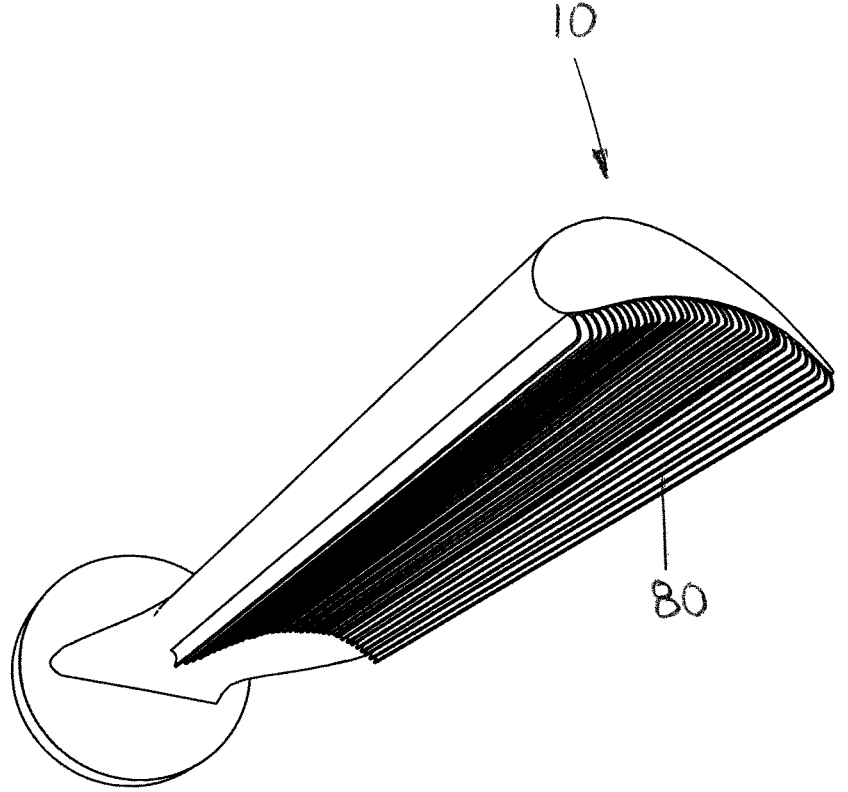
FIG. 19*c* is a perspective view of a modular blade assembly with a plurality of fins of the varying sizes attached to a bottom surface thereof and more densely packed than that of FIG. 19*b* in accordance with the present invention.
Figure 19D:
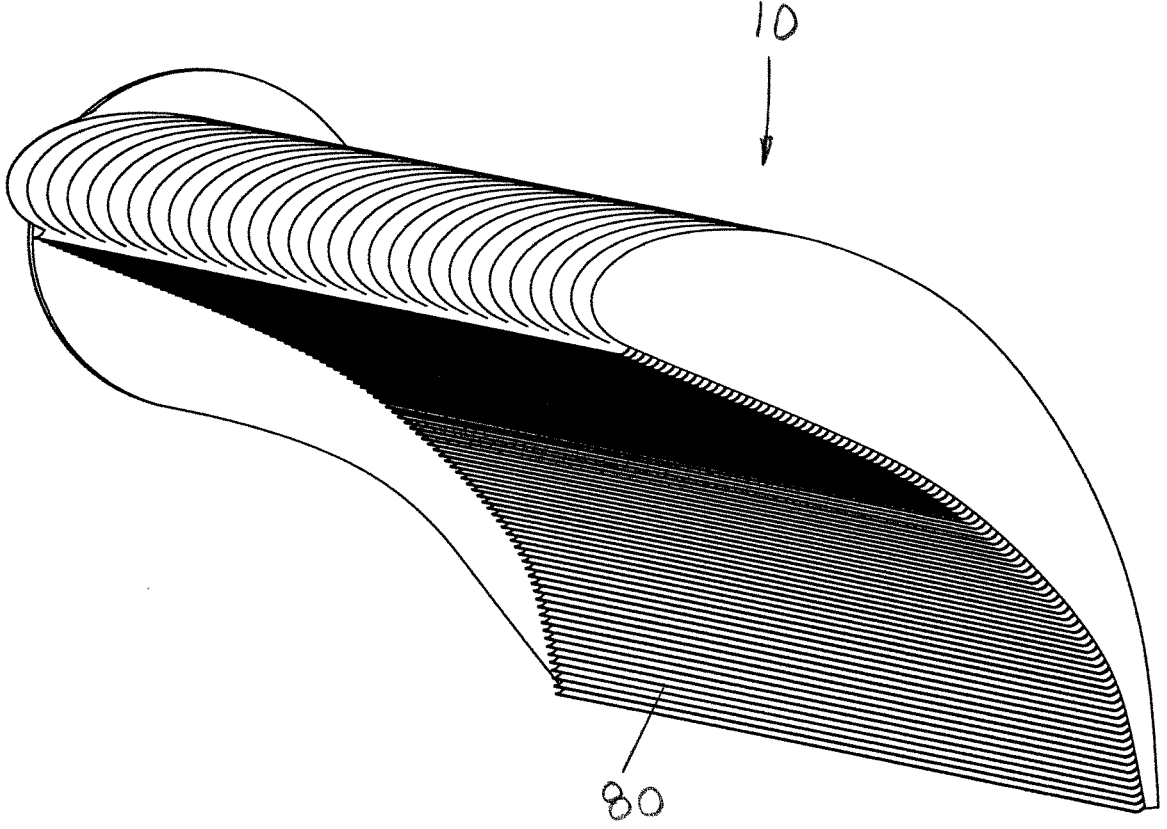
FIG. 19*d* is a perspective view of a second embodiment of a modular blade assembly with a plurality of fins of the varying sizes attached to a bottom surface thereof in accordance with the present invention.

With reference to FIGS. 19*a*-20, a plurality of fins 80 may be attached to a bottom surface of a modular blade assembly 10. The plurality of fins 80 may have the same size or have different sizes and being oriented at different angles. With reference to FIGS. 21*a*-21*b*, a fin actuation mechanism 82 may be used to change a position of a plurality of fins 84 relative to a bottom surface of the modular blade assembly 10. The fin actuation mechanism 82 preferably includes a plurality of actuators 86 and a pivoting fin rack 88. With reference to FIGS. 22*a*-22*c*, a plurality of sub fins 90 may be attached to each fin 88. A sub fin actuation mechanism may be used to change a position of the plurality of sub fins 90 relative to the fin 88. With reference to FIG. 23*a*, a plurality of "T" projections 92 may be formed on a bottom of each modular blade assembly 10 to maximize the use of available wind speed. With reference to FIG. 23*b*, a plurality of convex projections 94 may be formed on a bottom of each modular blade assembly 10 to maximize the use of available wind speed. With reference to FIG. 23*c*, a plurality of pointed convex projections 96 may be formed on a bottom of each modular blade assembly 10 to maximize the use of available wind speed. The size of modified bottom surface of the modular blade assembly 10 may range from sandpaper to a molded pattern up to a few inches in height. With reference to FIGS. 24*a* and 24*c*, the bottom surface of the modular blade assembly 10 is modified by forming a plurality of trapezoidal cavities 98 therein. With reference to FIG. 24*b*, the bottom surface of the modular blade assembly 10 is modified by forming a plurality of trapezoidal projections 112 thereupon. With reference to FIG. 24*d*, the bottom surface of the modular blade assembly 10 is modified by forming a plurality of trapezoidal projections 114 with a trapezoidal indentation 116 formed in each trapezoidal projection 114. With reference to FIGS. 25*a*-25*b*, a plurality of circular cavities 118 are formed in a bottom of the modular blade assembly 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A weight system for a modular blade assembly, comprising:
   a lengthwise frame which is retained in a length of said modular blade assembly;
   a rail structure extends along a length of said lengthwise frame;
   a sliding weight includes a plurality of wheels, said plurality of wheels roll along said rail structure;
   at least two weight motors are retained by said lengthwise frame; and
   at least two cables are coupled to an output shaft of said at least one weight motor, wherein said at least one motor moves said weight system from one end of said modular blade assembly to an opposing end of said modular blade assembly.

2. The weight system for a modular blade assembly of claim 1, further comprising:
   at least two cable pulleys are located on one end of said lengthwise frame and said at least two weight motors are located on an opposing end of said lengthwise frame.

3. The weight system for a modular blade assembly of claim 1, wherein:
   said sliding weight is located within an inner perimeter of said lengthwise frame.

4. The weight system for a modular blade assembly of claim 1, wherein:
   said at least two motors are driven by one of electricity, pneumatics or hydraulics.

5. The weight system for a modular blade assembly of claim 1, wherein:
   said sliding weight is located near a blade hub at start-up, said sliding weight is located at a distal end of said modular blade assembly at full rotation thereof.

6. A weight system for a modular blade assembly, comprising:
   a lengthwise frame which is retained in a length of said modular blade assembly;
   a sliding weight includes a plurality of wheels, said plurality of wheels roll along on an inner perimeter of said lengthwise frame;
   at least two weight motors are retained by said lengthwise frame; and
   at least two cables are coupled to an output shaft of said at least one weight motor, wherein said at least one motor moves said weight system from one end of said modular blade assembly to an opposing end of said modular blade assembly.

7. The weight system for a modular blade assembly of claim 6, further comprising:

at least two cable pulleys are located on one end of said lengthwise frame and said at least two weight motors are located on an opposing end of said lengthwise frame.

8. The weight system for a modular blade assembly of claim 6, wherein:

said sliding weight is located within an inner perimeter of said lengthwise frame.

9. The weight system for a modular blade assembly of claim 6, wherein:

said at least two motors are driven by one of electricity, pneumatics or hydraulics.

10. The weight system for a modular blade assembly of claim 6, wherein:

said sliding weight is located near a blade hub at start-up, said sliding weight is located at a distal end of said modular blade assembly at full rotation thereof.

\* \* \* \* \*